United States Patent
Chen et al.

(10) Patent No.: US 10,824,677 B2
(45) Date of Patent: Nov. 3, 2020

(54) METHOD AND SYSTEM FOR PROVIDING QUERY SUGGESTIONS

(71) Applicant: Yahoo Holdings, Inc., Sunnyvale, CA (US)

(72) Inventors: Zhongqiang Chen, San Jose, CA (US); Yuan Zhang, Milpitas, CA (US); Shenhong Zhu, Santa Clara, CA (US)

(73) Assignee: Oath Inc., New York, NY (US)

( * ) Notice: Subject to any disclaimer, the term of this patent is extended or adjusted under 35 U.S.C. 154(b) by 597 days.

(21) Appl. No.: 15/249,899

(22) Filed: Aug. 29, 2016

(65) Prior Publication Data
US 2018/0060339 A1 Mar. 1, 2018

(51) Int. Cl.
*G06F 16/00* (2019.01)
*G06F 16/9032* (2019.01)
*G06F 16/2453* (2019.01)
*G06F 16/2455* (2019.01)

(52) U.S. Cl.
CPC .. *G06F 16/90324* (2019.01); *G06F 16/24534* (2019.01); *G06F 16/24556* (2019.01)

(58) Field of Classification Search
CPC .......... G06F 17/30448; G06F 17/3061; G06F 17/30634; G06F 17/30637; G06F 17/3064; G06F 17/30646; G06F 17/30672; G06F 17/30693; G06F 17/30943; G06F 17/30964; G06F 17/30967; G06F 17/3097
See application file for complete search history.

(56) References Cited

U.S. PATENT DOCUMENTS

| | | | |
|---|---|---|---|
| 9,235,654 B1 * | 1/2016 | Gupta | G06F 16/90324 |
| 2009/0144240 A1 * | 6/2009 | Singh | G06F 16/951 |
| 2010/0005092 A1 * | 1/2010 | Matson | G06F 16/3325 |
| | | | 707/E17.017 |
| 2010/0169361 A1 * | 7/2010 | Chen | G06F 16/285 |
| | | | 707/769 |
| 2010/0185644 A1 * | 7/2010 | Gutt | G06F 16/951 |
| | | | 707/759 |
| 2011/0145268 A1 * | 6/2011 | Agarwal | G06F 16/3335 |
| | | | 707/765 |
| 2012/0254218 A1 * | 10/2012 | Ali | G06F 16/3338 |
| | | | 707/765 |
| 2015/0006563 A1 * | 1/2015 | Carattini | G06F 16/24534 |
| | | | 707/765 |
| 2016/0078101 A1 * | 3/2016 | Somaiya | G06F 16/3322 |
| | | | 707/706 |

* cited by examiner

*Primary Examiner* — Diedra McQuitery
(74) *Attorney, Agent, or Firm* — Pillsbury Winthrop Shaw Pittman LLP

(57) ABSTRACT

Methods, systems and programming for providing query suggestions. In one example, a search query is received from a user. At least one rewritten search query is generated by replacing at least some text in the search query with a synonym of the at least some text. The synonym of the at least some text is obtained based on a plurality of previously submitted search queries. A plurality of query suggestions is obtained based on the search query and the at least one rewritten search query. At least a portion of the plurality of query suggestions is provided to the user.

21 Claims, 32 Drawing Sheets

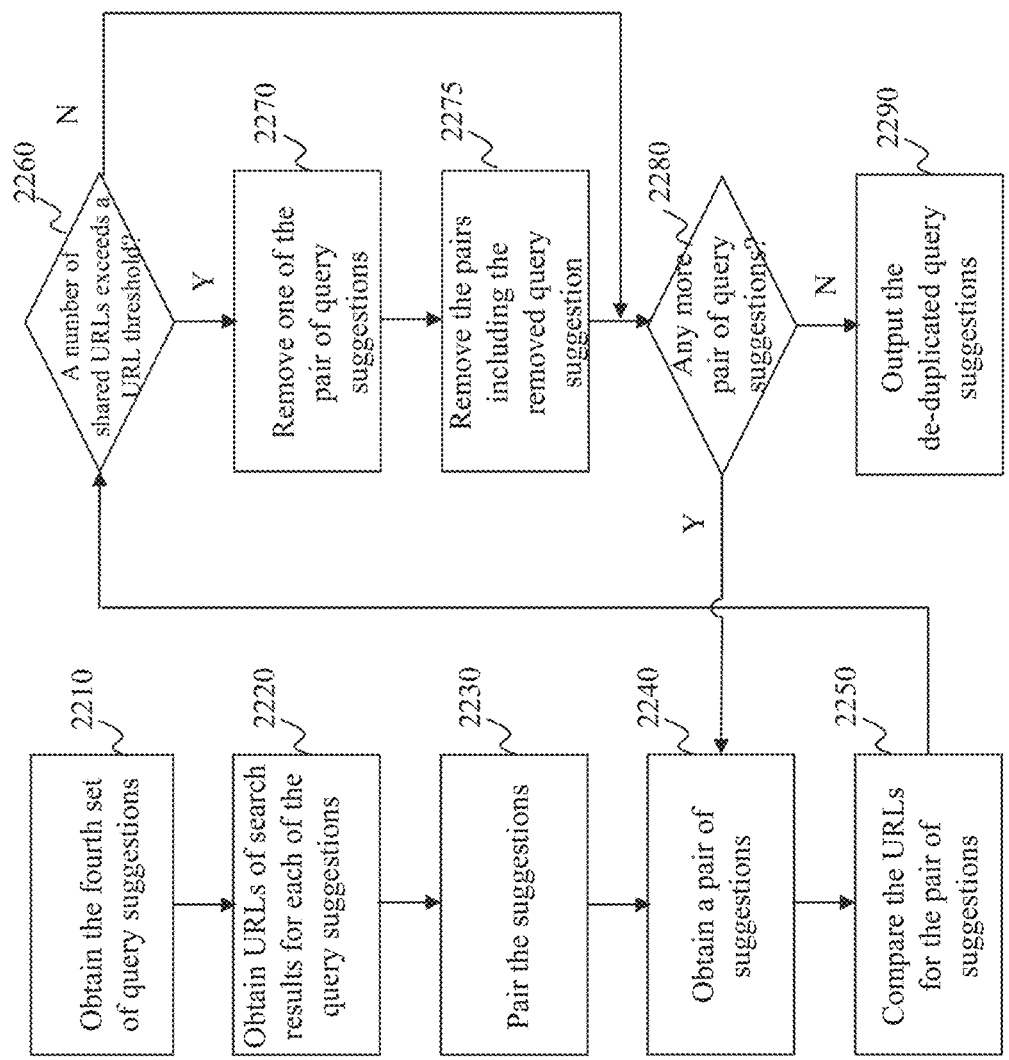

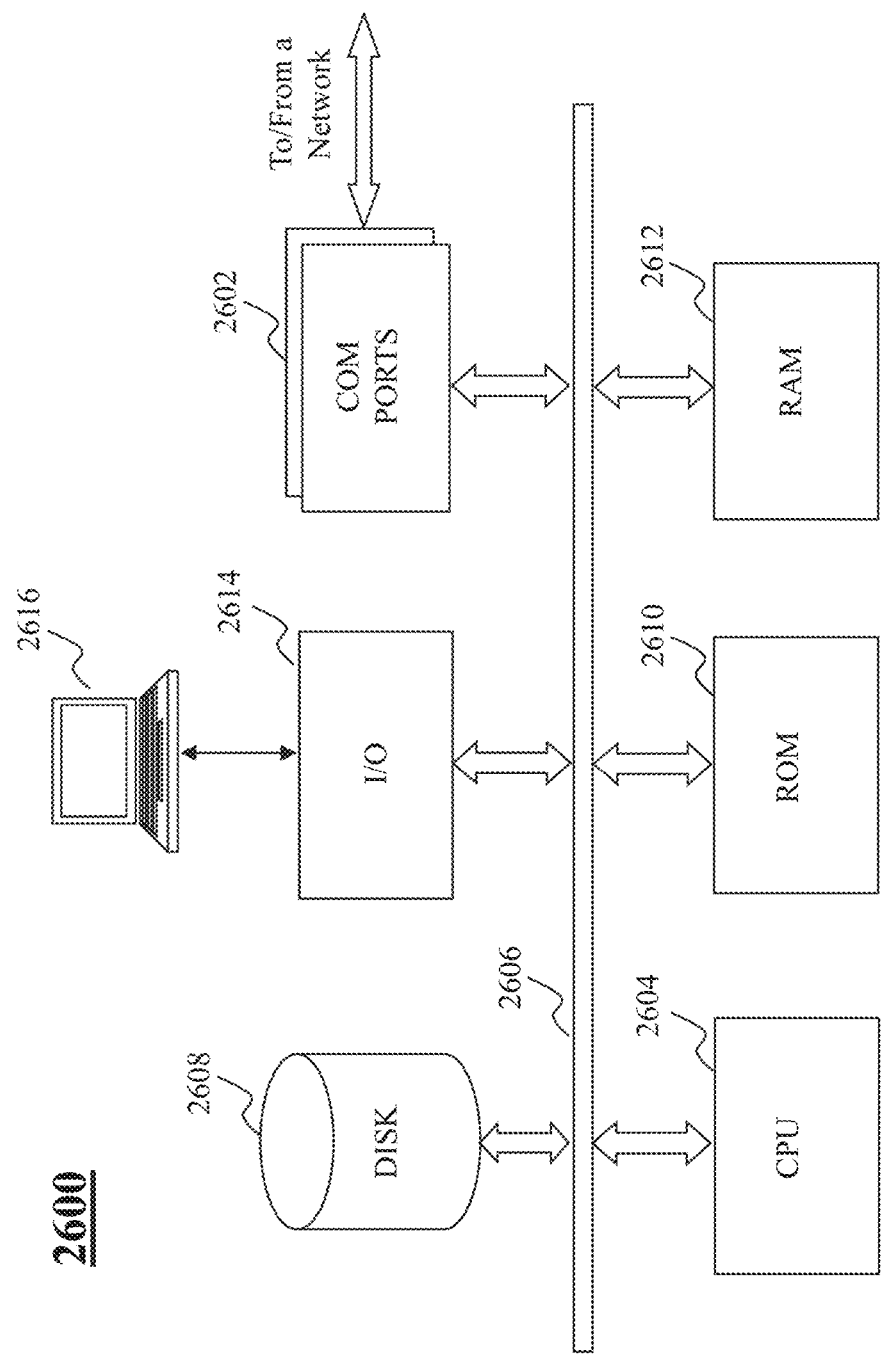

METHOD AND SYSTEM FOR PROVIDING QUERY SUGGESTIONS

BACKGROUND

1. Technical Field

The present teaching relates to methods, systems, and programming for Internet services. Particularly, the present teaching is directed to methods, systems, and programming for providing query suggestions.

2. Discussion of Technical Background

Online content search is a process of interactively searching for and retrieving requested information via a search application running on a local user device, such as a computer or a mobile device, from online databases. Online content search is conducted through search engines, which are programs running at a remote server and searching documents for specified keywords and return a list of the documents where the keywords were found. In addition, a known feature of the online content search for providing "query suggestions" is designed to help users narrow in on what they are looking for. For example, as a user types a search query, a list of query suggestions that have been used by many other users before are displayed to assist the user in selecting a desired query.

The existing techniques of obtaining the list of query suggestions are performed by retrieving a plurality of previously submitted search queries whose prefixes match the search query from a user. For example, when a user inputs "president" to the query suggestion generator through a user device, the query suggestion generator would retrieve a plurality of previously submitted search queries that start with "president," as the list of query suggestions to be presented to the user. The list of query suggestions may include, but are not limited to, "president Obama," "presidential polls," and "presidential debate." In some examples, when the query suggestion generator cannot find enough query suggestions whose prefixes match the search query from the user, the query suggestion generator would attempt to reorder the phrases in the search query to form a reordered search query, and then retrieve query suggestions from the plurality of previously submitted search queries whose prefixes match the reordered search query. For example, when a user inputs "states united of america" as a search query, the query suggestion generator would reorder the search query to "united states of america," since not enough query suggestions can be obtained from the plurality of previously submitted search queries starting with "states united of america." The query suggestion generator then attempts to retrieve a list of query suggestions from the plurality of previously submitted search queries which start with "united states of america." For example, the list of query suggestions may include, but are not limited to, "united states america map," "united states america population," and "united states of america flag." In some examples, when the search query or the reordered search query include one or more stop words, for example, "a," "an," "the," etc., the query suggestion generator may remove the one or more stop words from the search query or the reordered search query before retrieving the query suggestions.

However, in some examples, the existing techniques as described above cannot provide enough high quality query suggestions to the user based on the search query from the user. For example, when the user inputs "04 suzuki z25" as the search query, the query suggestion generator may only provide one query suggestion, for example, "04 suzuki z250" to the user based on the existing techniques. This is because "04 suzuki z25" is not a common term that used by the online users to conduct search on internet.

Further, in some examples, the list of query suggestions provided to the user may include duplicated query suggestions that negatively affect the user's search experience. For example, the user may input "4shared" to the user device, the query suggestion generator may provide a list of query suggestions including "4shared mp3" and "4shared mp3 downloads," based on the existing techniques as described above. Although different, "4shared mp3" and "4shared mp3 downloads" may be regarded as duplicated query suggestions since identical similar results are expected by selecting the query suggestions of "4shared mp3" and "4shared mp3 downloads." In addition, the existence of duplicated query suggestions causes the precious real estate on a query suggestion presentation area to be wasted.

Therefore, there is a need to provide an improved solution for providing search suggestions to solve the above-mentioned problems.

SUMMARY

The present teaching relates to methods, systems, and programming for Internet services. Particularly, the present teaching is directed to methods, systems, and programming for providing search suggestions.

In one example, a method, implemented on at least one machine each having at least one processor, storage, and a communication platform connected to a network for providing query suggestions is presented. A search query is received from a user. At least one rewritten search query is generated by replacing at least some text in the search query with a synonym of the at least some text. The synonym of the at least some text is obtained based on a plurality of previously submitted search queries. A plurality of query suggestions is obtained based on the search query and the at least one rewritten search query. At least a portion of the plurality of query suggestions is provided to the user.

In another example, a system having at least one processor, storage, and a communication platform for providing query suggestions is presented. The system includes a lookup engine, a query rewriter, and a suggestion selector. The lookup engine is configured to receive a search query from a user, and obtain a plurality of query suggestions based on the search query and the at least one rewritten search query. The query rewriter configured to generate at least one rewritten search query by replacing at least some text in the search query with a synonym of the at least some text, wherein the synonym of the at least some text is obtained based on a plurality of previously submitted search queries. The suggestion selector configured to provide at least a portion of the plurality of query suggestions to the user.

Other concepts relate to software for providing query suggestions. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for providing query suggestions is presented. The recorded information, when read by the machine, causes the machine to perform the following. A search query is received from a user. At least one rewritten search query is generated by replacing at least some text in the search query with a synonym of the at least some text. The synonym of the at least some text is obtained based on a plurality of previously submitted search queries. A plurality of query suggestions is obtained based on the search query and the at least one rewritten search query. At least a portion of the plurality of query suggestions is provided to the user.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 22 is a flowchart of an exemplary process for semantic-based deduplication, according to an embodiment of the present teaching;

FIG. 26 depicts a general computer architecture on which the present teaching can be implemented.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of providing query suggestions based on a search query from a user. The method and system as disclosed herein aim at improving a user' search experience by rewriting the search query, obtaining a plurality of query suggestions based on the rewritten search query, and removing duplicated query suggestions from the plurality of query suggestions. For example, when the user inputs a search query to a query suggestion generator through a user device (e.g., a laptop), the query suggestion generator may retrieve, from a plurality of previously submitted search queries, a first group of query suggestions based on the search query from the user. The query suggestion generator may remove one or more duplicated query suggestions from the first group, which may result in similar search results. When the number of query suggestions in the first group does not reach a threshold, the search query is rewritten to a rewritten search query by replacing at least some text in the search query with a synonym of the at least some text. The synonym is obtained from a synonym database built automatically based on the plurality of previously submitted search queries. The query suggestion generator then retrieves, from the plurality of previously submitted search queries, a second group of query suggestions based on the rewritten search query. Similar as above, the query suggestion generator may remove one or more duplicated query suggestions from the second group, which may result in similar search results. When the total number of query suggestions in the first group and the second group does not reach the threshold, the search query is rewritten to another rewritten search query in a similar manner as described above. The process continues until the total number of query suggestions reaches the threshold.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1A:
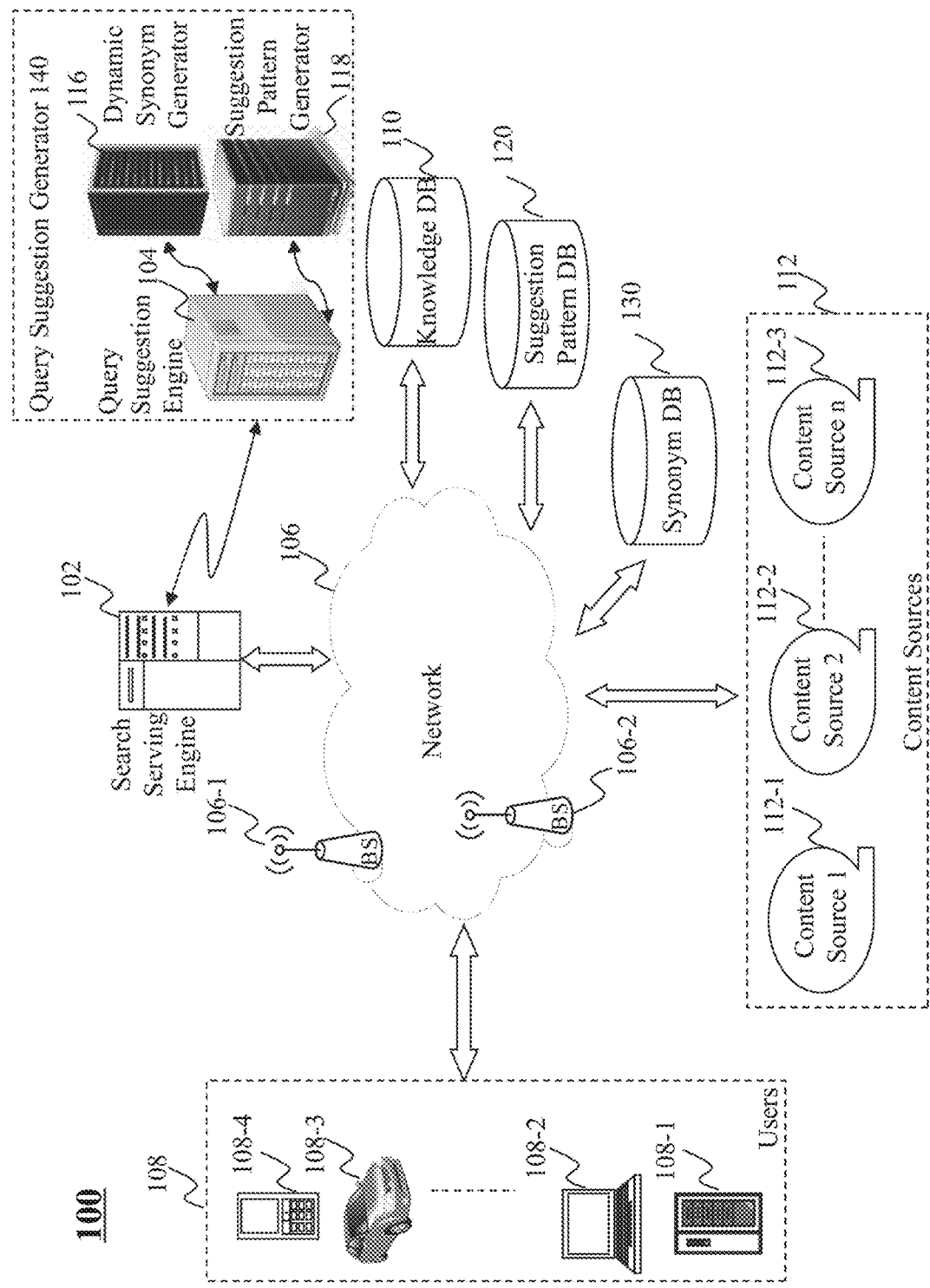
FIGS. 1A-1D are high level depictions of various exemplary systems for providing a search result, according to an embodiment of the present teaching.

FIGS. 1A-1D are high level depictions of various exemplary systems 100, 103, 105, 107 for providing query suggestions based on a search query from a user, according to an embodiment of the present teaching. In FIG. 1A, the exemplary system 100 includes a search serving engine 102, a query suggestion generator 140, one or more user devices 108, a network 106, content sources 112, and a knowledge database 110. The network 106 may be a single network or a combination of different networks. For example, the network 106 may be a local area network (LAN), a wide area network (WAN), a public network, a private network, a proprietary network, a Public Telephone Switched Network (PSTN), the Internet, a wireless network, a virtual network, or any combination thereof. The network 106 may also include various network access points, e.g., wired or wireless access points such as base stations or Internet exchange points 106-1 . . . 106-2, through which a data source may connect to the network 106 in order to transmit information via the network 106.

User devices 108 may be of different types connected to the network 106. For example, the user devices 108 may include, but are not limited to, desktop computers 108-1, laptop computers 108-2, a built-in device in a motor vehicle 108-3, and/or a mobile device 108-4. A user device 108 may receive a search query from a user and transmit the search query to the search serving engine 102 via the network 106 and receive query suggestions and search results from the search serving engine 102. The query suggestions can be generated at the query suggestion generator 140, based on the query sent by the user device 108. In an embodiment, the query suggestion generator 140 serves as a backend system of the search serving engine 102. As shown in FIG. 1A, the query suggestion generator 140 comprises a query suggestion engine 104, a dynamic synonym generator 116, and a suggestion pattern generator 118, which will be described in great detail in FIGS. 3, 5, and 15, respectively.

The search serving engine 102 and query suggestion generator 140 may access information stored in the knowledge database 110 via the network 106. The information in the knowledge database 110 may be generated by one or more different applications (not shown), which may be running on the search serving engine 102, at the backend of the search serving engine 102, or as a completely standalone system capable of connecting to the network 106, accessing information from different sources, analyzing the information, generating structured information, and storing such generated information in the knowledge database 110. In an embodiment, the knowledge database 110 includes a plurality of previously submitted search queries.

The content sources 112 include multiple content sources 112-1, 112-2 . . . 112-3, such as vertical content sources. A content source 112 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search serving engine 102 may access information from any of the content sources 112-1, 112-2 . . . 112-3. For example, the search serving engine 102 may fetch content, e.g., websites, through its web crawler to build a search index.

Figure 1B:
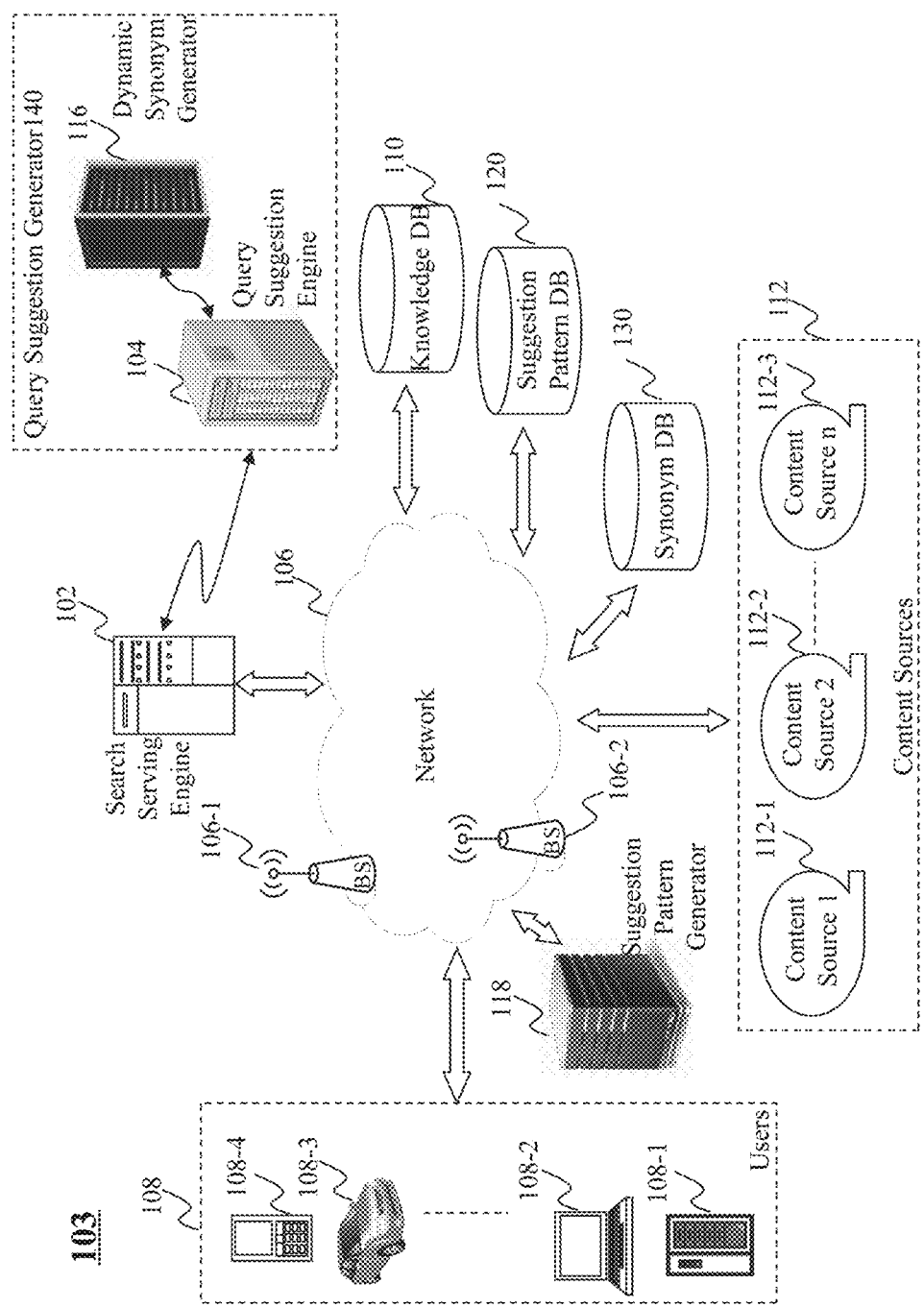
Figure 1C:
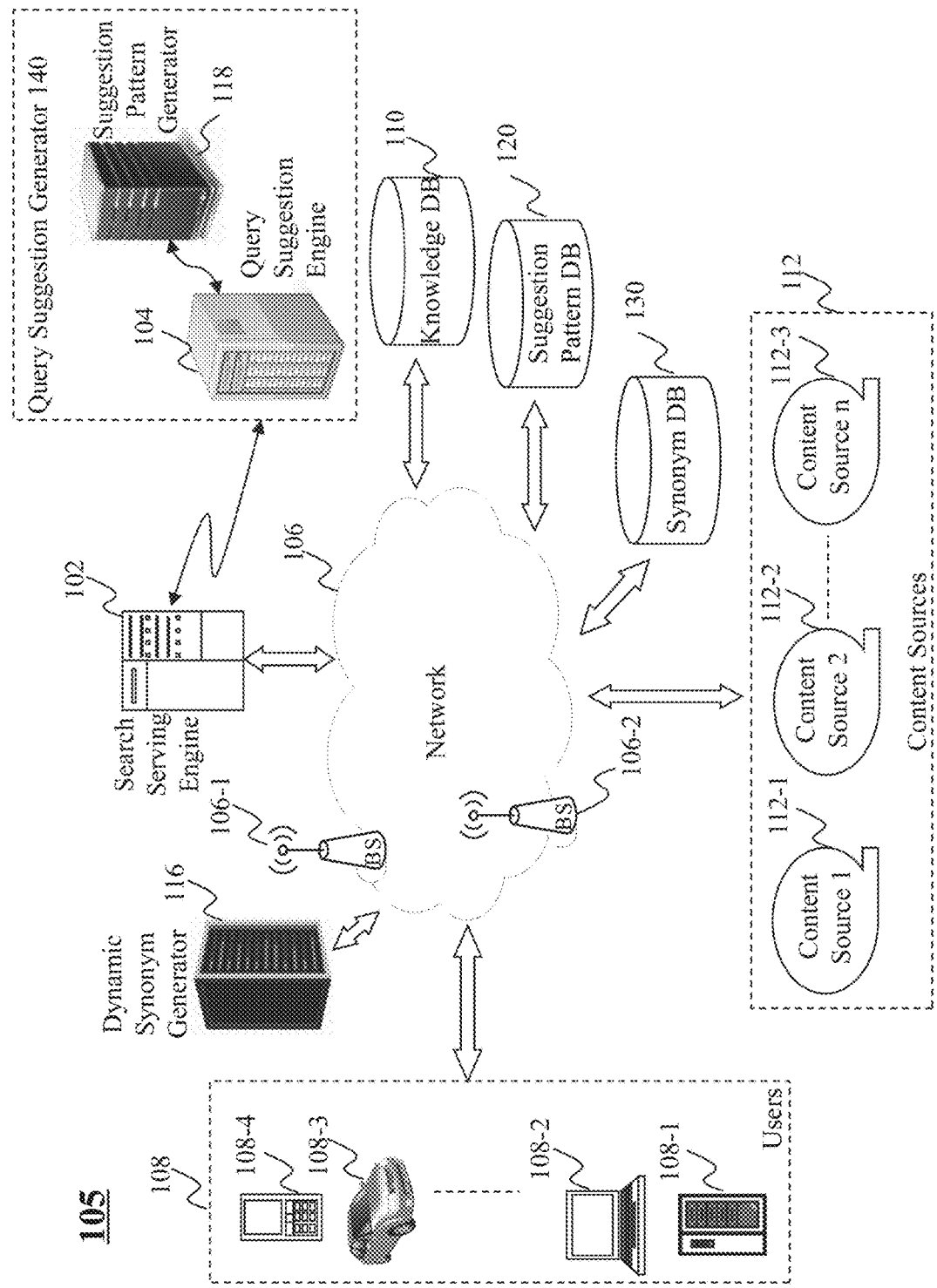
Figure 1D:
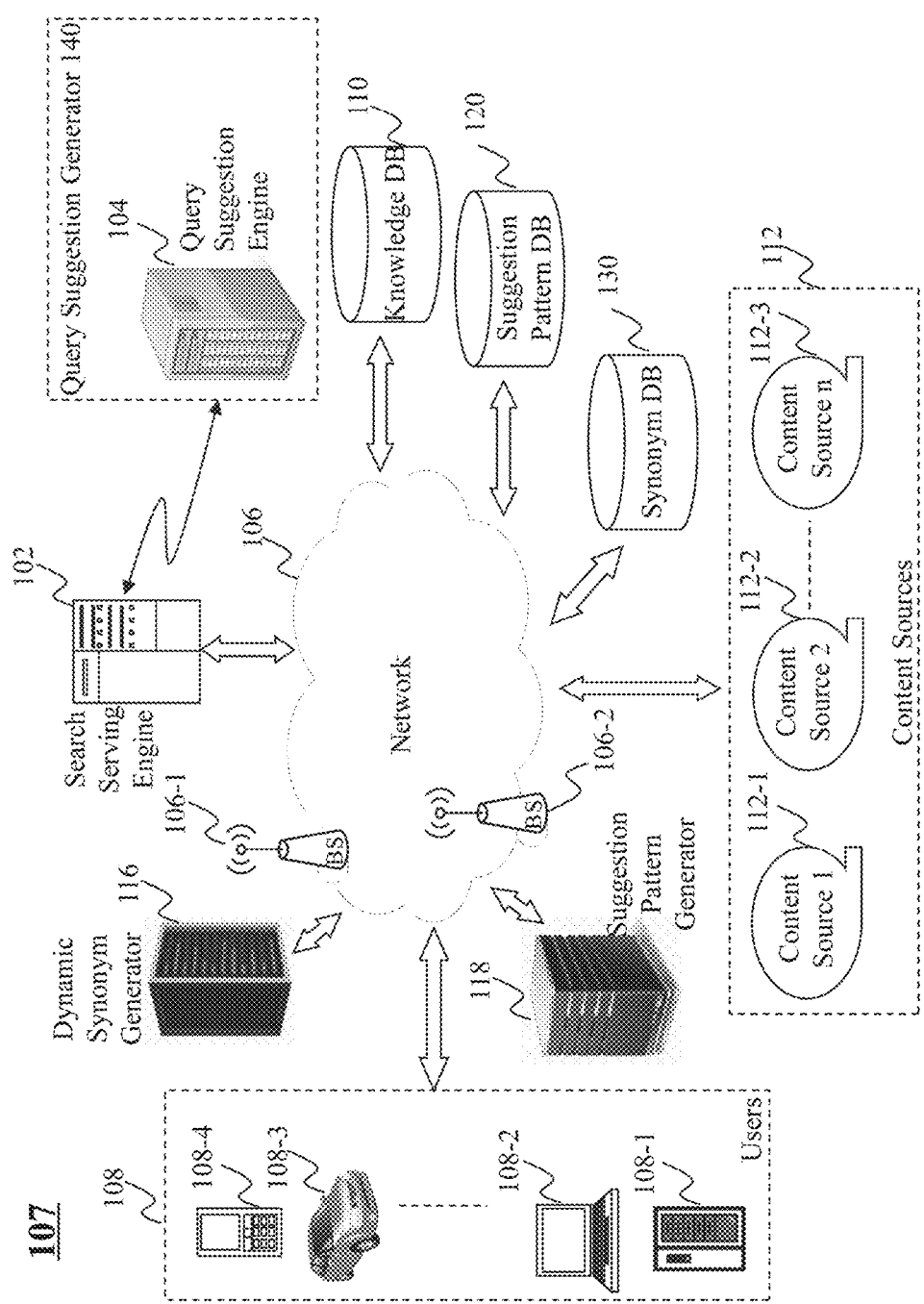
Figure 2A:
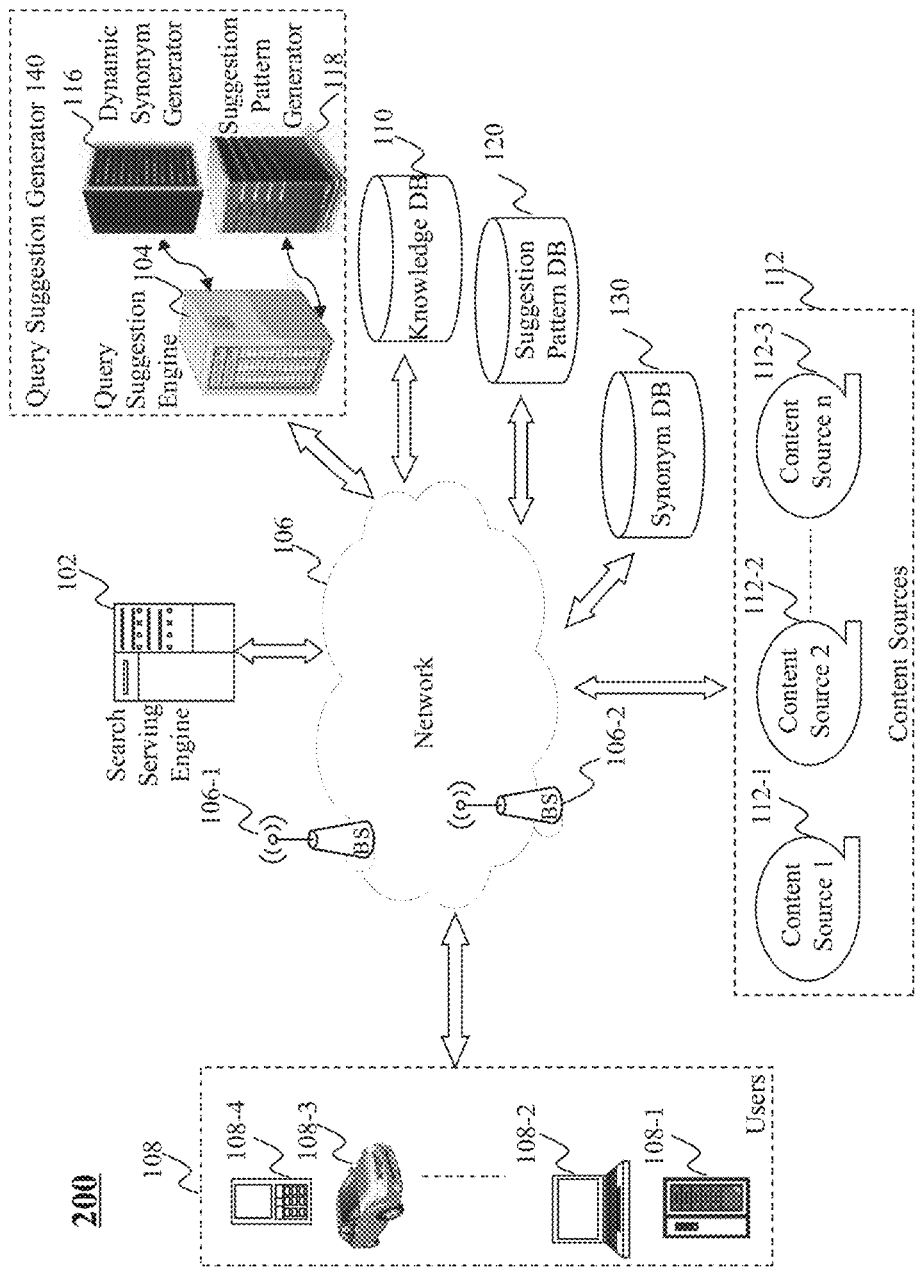
FIGS. 2A-2D are high level depictions of various exemplary systems for providing a search result, according to an embodiment of the present teaching.
Figure 2B:
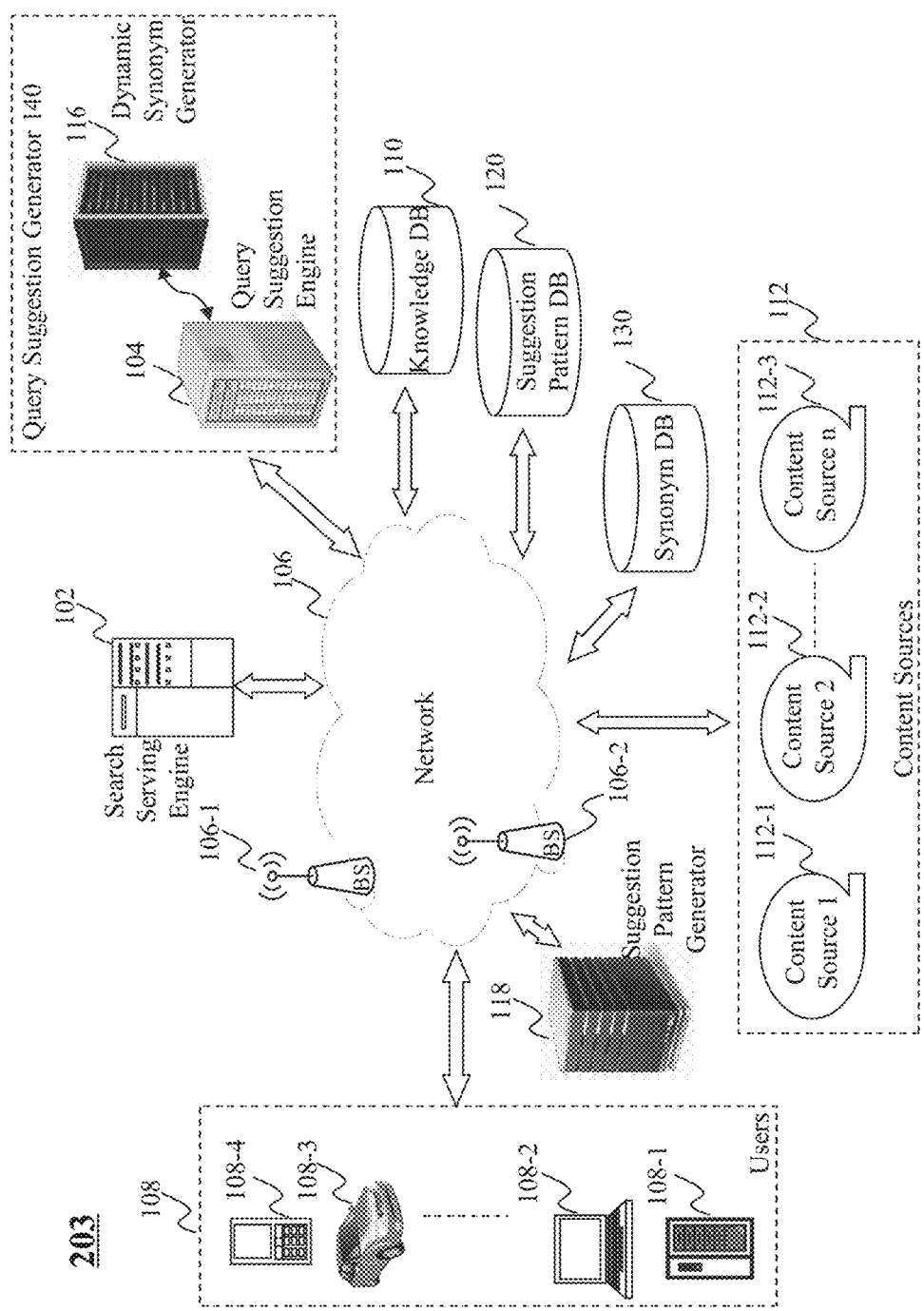
Figure 2C:
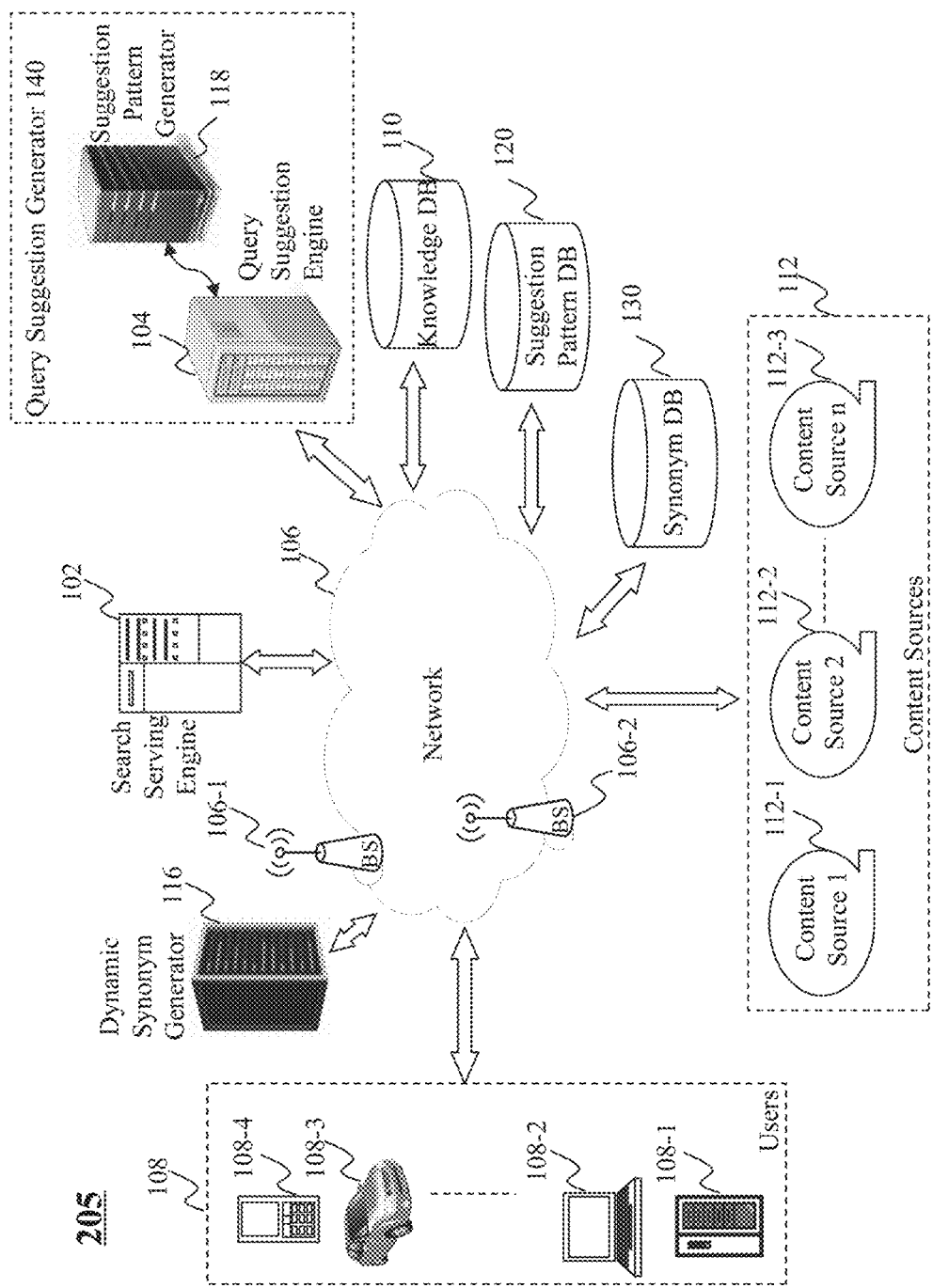
Figure 2D:
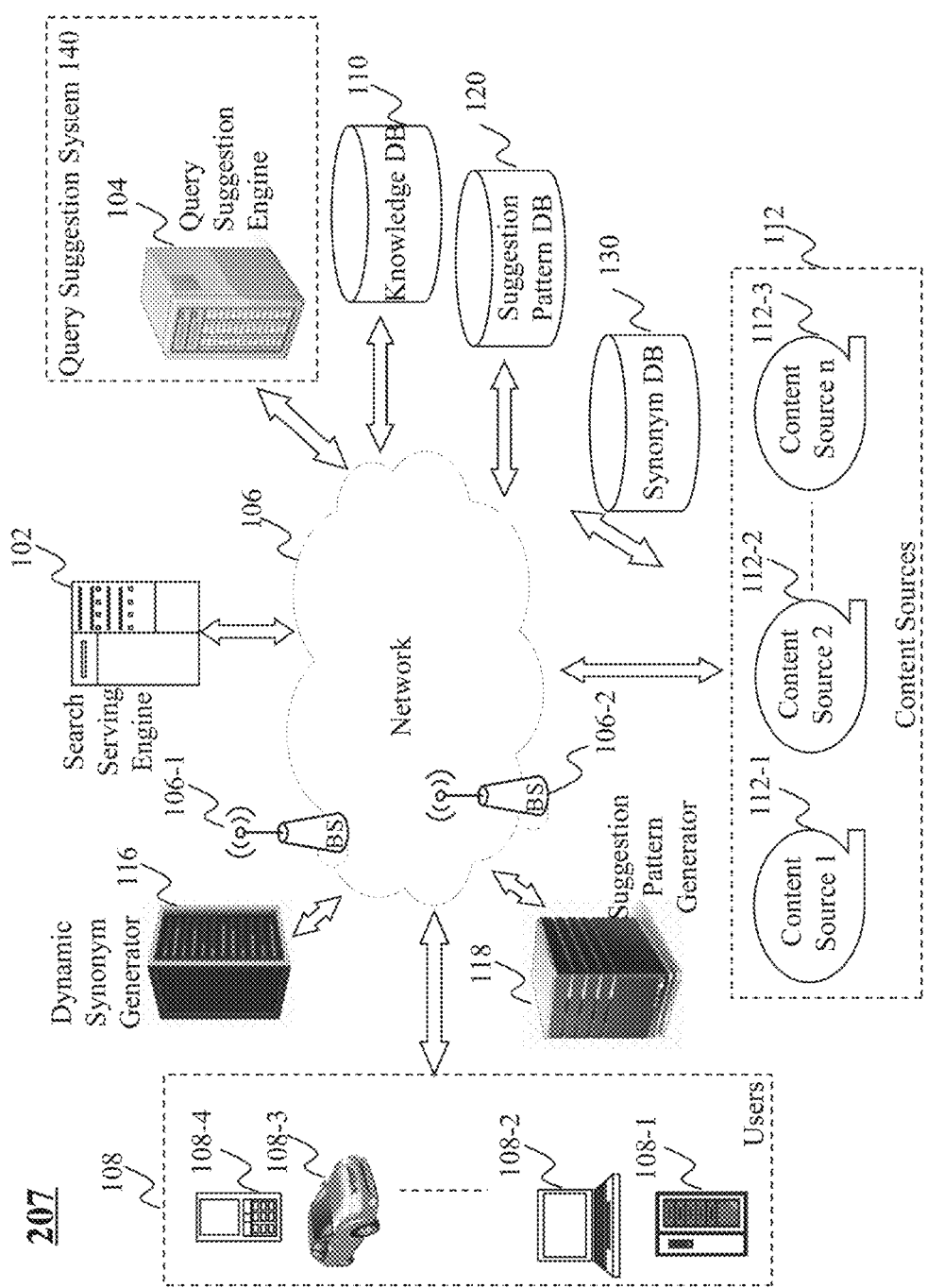

In FIG. 1B, the exemplary system 103 is similar to the exemplary system 100 in FIG. 1A, except that the suggestion pattern generator 118 is separated from the query suggestion generator 140 as a standalone device connected to the network 106 directly. In FIG. 1C, the exemplary system 105 is similar to the exemplary system 100 in FIG. 1A, except that the dynamic synonym generator 116 is separated from the query suggestion generator 140 as a standalone device connected to the network 106 directly. In FIG. 1D, the exemplary system 107 is similar to the exemplary system 100 in FIG. 1A, except that both the dynamic synonym generator 116 and the suggestion pattern generator 118 are separated from the query suggestion generator 140 as standalone devices connected to the network 106 directly. In this embodiment, the query suggestion generator 140 includes merely the query suggestion engine 104.

FIGS. 2A-2D are high level depictions of various exemplary systems 200, 203, 205, 207 for providing query suggestions, according to an embodiment of the present teaching. The exemplary systems 200, 203, 205, 207 in FIGS. 2A-2D are similar to the exemplary systems 100, 103, 105, 107 in FIGS. 1A-1D, except that the query suggestion generator 140 in FIGS. 2A-2D directly connects to the network 106. The exemplary systems 200, 203, 205, 207 in FIGS. 2A-2D may be particular useful when the query suggestion generator 140 needs to serve multiple search serving engines 102 at the same time via the network 106.

Figure 3:
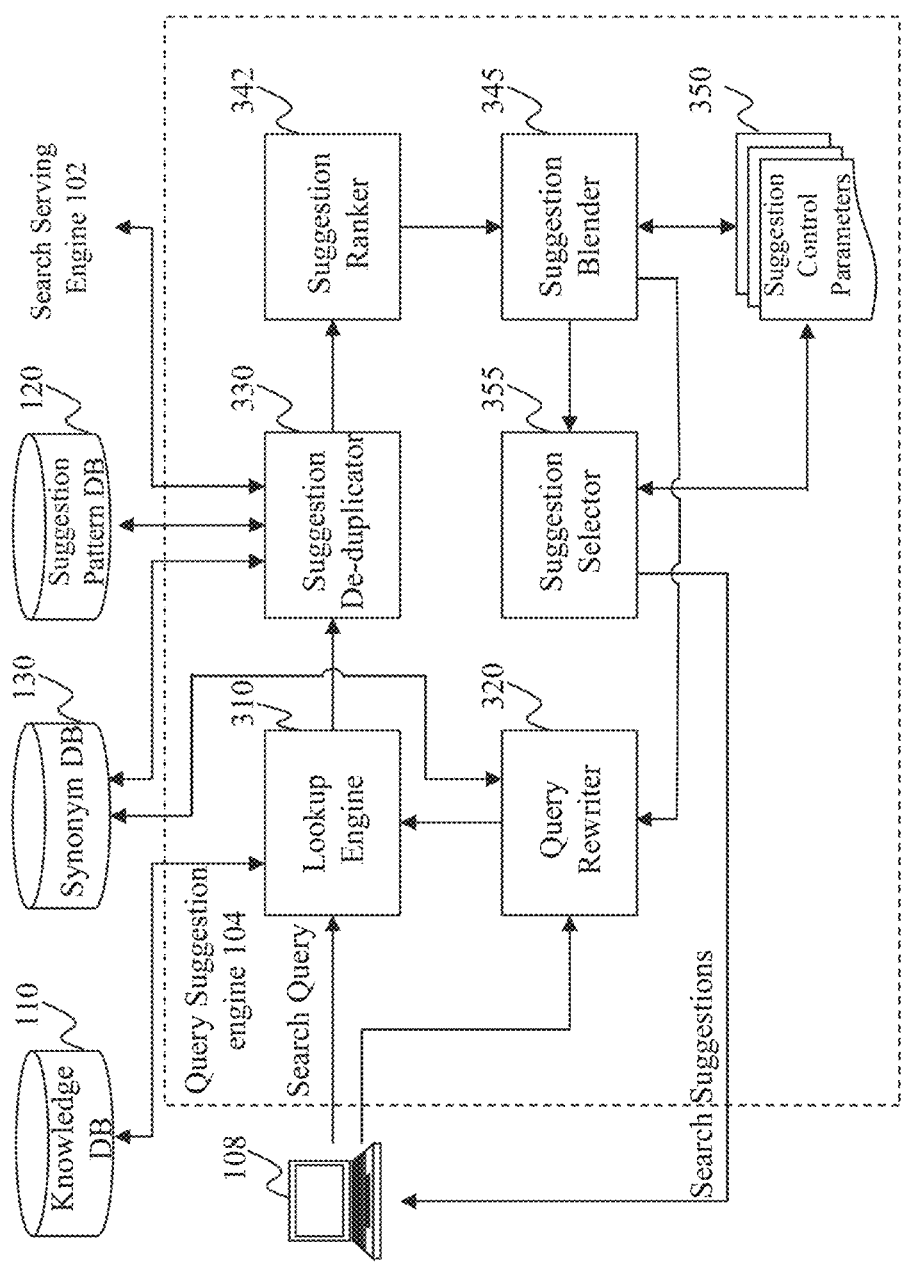
FIG. 3 illustrates an exemplary diagram of a query suggestion engine, according to an embodiment of the present teaching.

FIG. 3 illustrates an exemplary diagram of the query suggestion engine 104, according to an embodiment of the present teaching. The query suggestion engine 104 may be located in the query suggestion generator 140 as shown in FIGS. 1A-1D and FIGS. 2A-2D. The query suggestion engine 104 in this example includes a lookup engine 310, a suggestion de-duplicator 330, a suggestion ranker 342, a suggestion blender 345, a suggestion selector 355, and a query rewriter 320.

The lookup engine 310 receives a search query from a user, for example, through the user device 108. The lookup engine 310 further determines a set of query suggestions from a plurality of previously submitted search queries. As described above, the plurality of previously submitted search queries may be stored in the knowledge database 110 as shown in FIGS. 1A-1D and FIGS. 2A-2D. In an embodiment, the set of query suggestions may be determined based on the search query from the user. In an embodiment, the set of query suggestions may be determined based on the rewritten search query obtained at step 455, as will be described below. In an embodiment, each of the set of query suggestions has a prefix matching the search query or the rewritten search query. In an embodiment, the phrases in the search query or the rewritten search query are reordered to form a reordered search query or a reordered rewritten search query. Accordingly, each of the set of query suggestions has a prefix matching the reordered search query or the reordered rewritten search query. In an embodiment, one or more stop words (e.g., "a," "an," "the," etc.) may be removed from the search query and/or the reordered search query. In an embodiment, the one or more stop words may be also removed from the rewritten search query and/or the reordered rewritten search query. In an embodiment, each of the set of query suggestions is associated with a score determined based on how many times the query suggestion has been submitted by online users before. For examples, a query suggestion that has been submitted for 1000 times may be associated with a higher score than another query suggestion that has been submitted for 100 times. Particularly, when the set of query suggestions are determined based on the rewritten search query, the scores associated with the set of query suggestions may be adjusted, e.g., reduced by a certain percentage. This is because the set of query suggestions determined based on the search query from the user is generally more likely to match the user's search intent than the set of query suggestions determined based on the rewritten search query.

The suggestion de-duplicator 330 removes one or more duplicated query suggestions from the set of query suggestions. As shown in FIG. 3, the suggestion de-duplicator 330 is accessible to, or coupled to the knowledge database 110, the synonym database 130, the suggestion pattern database 120, and the search serving engine 102. The suggestion ranker 342 ranks the remaining query suggestions of the set based on the score associated with each of the remaining query suggestions.

The suggestion blender 345 determines whether the search query from the user has been rewritten. If so, the suggestion blender 345 blends the set of query suggestions with the prior set(s) of query suggestions to obtain blended query suggestions. The blended query suggestions are ranked based on the associated scores. The suggestion blender 345 further determines whether the total number of query suggestions reaches a suggestion length limit. The suggestion length limit indicates a desirable number of suggestions to be presented to the user. If not, the suggestion blender 345 further determines whether the search query has been rewritten for a certain times. The certain times may be denoted by $a_{max}$, which may be any suitable positive integer. If so, the suggestion blender 345 instructs to operate the suggestion selector 355. Otherwise, the suggestion blender 345 instructs to operate the query rewriter 320. In an embodiment, the suggestion length limit and the certain times, $a_{max}$ are both stored as suggestion control parameters 350.

The query rewriter 320 rewrites the search query to generate a rewritten search query by replacing one or more phrases (in form of text) of the search query with one or more synonyms of the one or more phrases. The one or more synonyms are obtained from the synonym database 130 determined based on a plurality of previously submitted search queries from the knowledge database 110, as will be described in greater detail below.

The suggestion selector 355 selects at least a portion of the query suggestions, for example, based on the ranking of the query suggestions. In an embodiment, when the total number of query suggestions reaches or exceeds the suggestion length limit, the top ranked query suggestions are selected, the number of the selected query suggestions being equal to the suggestion length limit. In an embodiment, when the total number of query suggestions does not reach the suggestion length limit, all the query suggestions are selected. At step 460, the selected query suggestions are presented to the user, for example, in a query suggestion presentation area.

Figure 4:
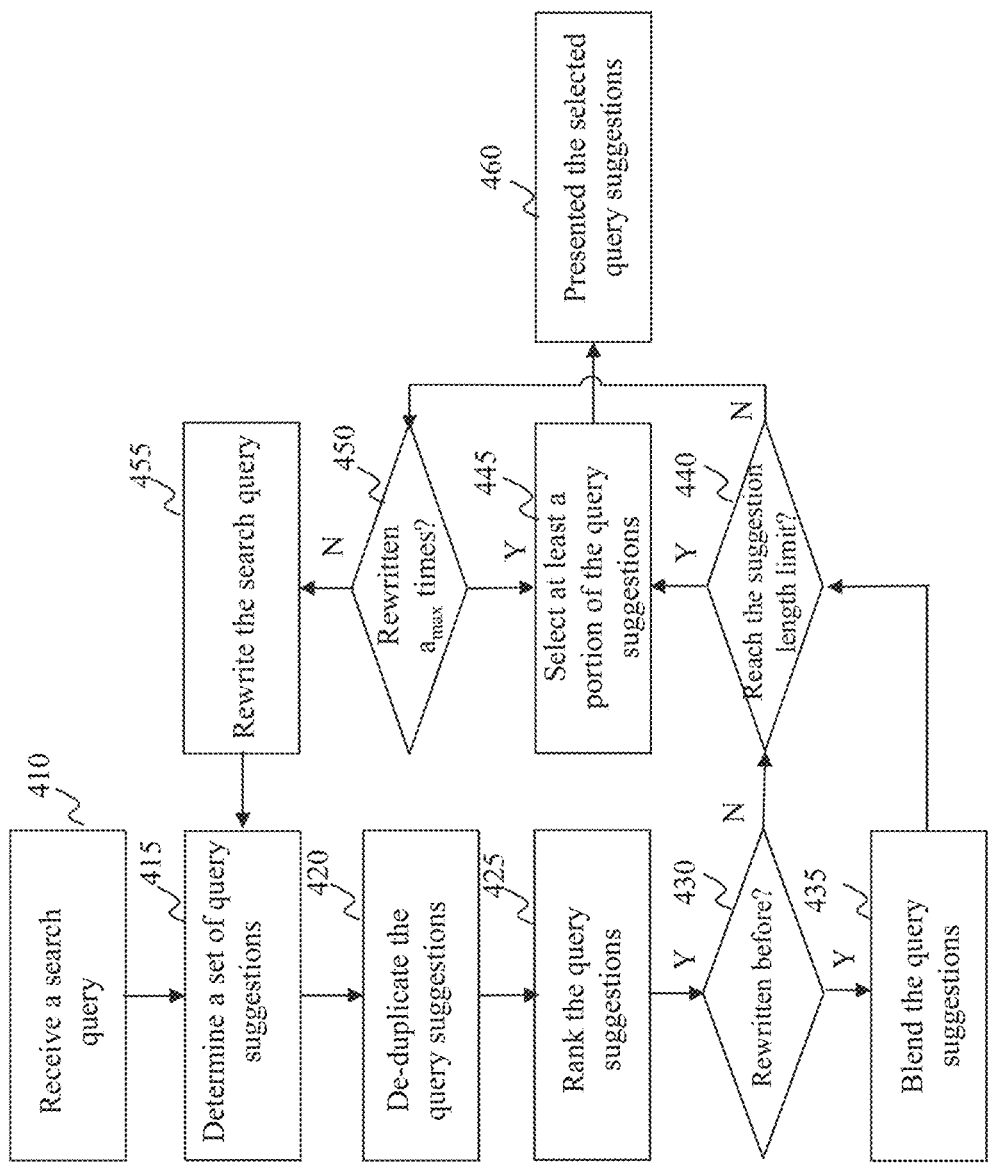
FIG. 4 is a flowchart of an exemplary process for providing query suggestions to a user, according to an embodiment of the present teaching.

FIG. 4 is a flowchart of an exemplary process for providing query suggestions, according to an embodiment of the present teaching. In an embodiment, the exemplary process as shown in FIG. 4 may be performed by the query suggestion engine in FIG. 3.

At step 410, a search query is received from a user, for example, through a user device 108. At step 420, a set of query suggestions are determined from a plurality of previously submitted search queries. As described above, the plurality of previously submitted search queries may be stored in the knowledge database 110 as shown in FIGS. 1A-1D and FIGS. 2A-2D. In an embodiment, the set of query suggestions may be determined based on the search query from the user. In an embodiment, the set of query suggestions may be determined based on the rewritten search query obtained at step 455, as will be described below. In an embodiment, each of the set of query suggestions has a prefix matching the search query or the rewritten search query. In an embodiment, the phrases in the search query or the rewritten search query are reordered to form a reordered search query or a reordered rewritten search query. Accordingly, each of the set of query suggestions has a prefix matching the reordered search query or the reordered rewritten search query. In an embodiment, one or more stop words (e.g., "a," "an," "the," etc.) may be removed from the search query and/or the reordered search query. In an embodiment, the one or more stop words may be also removed from the rewritten search query and/or the reordered rewritten search query. In an embodiment, each of the set of query suggestions is associated with a score determined based on how many times the query suggestion has been submitted by online users before. For examples, a query suggestion that has been submitted by 1000 times may be associated with a higher score than another query suggestion that has been submitted by 100 times. Particularly, when the set of query suggestions are determined based on the rewritten search query, the scores associated with the set of query suggestions may be adjusted, e.g., reduced by a certain percentage. This is because the set of query suggestions determined based on the search query from the user is generally more likely to match the user's search intent than the set of query suggestions determined based on the rewritten search query.

At step 420, one or more duplicated query suggestions are removed from the set of query suggestions. At step 425, the remaining query suggestions of the set are ranked based on the score associated with each of the remaining query suggestions. At step 430, it is determined whether the search query from the user has been rewritten. If so, the process proceeds to step 435. Otherwise, the process proceeds to step 440.

At step 435, the set of query suggestions are blended with the prior set(s) of query suggestions to obtain blended query suggestions. The blended query suggestions are ranked based on the associated scores. At step 440, it is determined whether the total number of query suggestions reaches a suggestion length limit. The suggestion length limit indicates a desirable number of suggestions to be presented to the user. If so, the process proceeds to step 445. Otherwise, the process proceeds to step 450.

At step 450, it is determined whether the search query has been rewritten for a certain times. The certain times may be denoted by $a_{max}$, which may be any suitable positive integer. If so, the process proceeds to step 445. Otherwise, the process proceeds to step 455.

At step 455, the search query is rewritten by replacing one or more phrases (in form of text) of the search query with one or more synonyms of the one or more phrases. The one or more synonyms are obtained from a synonym database determined based on a plurality of previously submitted search queries, as will be described in greater detail below.

At step 445, at least a portion of the query suggestions are selected, for example, based on the ranking of the query suggestions. In an embodiment, when the total number of query suggestions reaches or exceeds the suggestion length limit, the top ranked query suggestions are selected, the number of the selected query suggestions being equal to the suggestion length limit. In an embodiment, when the total number of query suggestions does not reach the suggestion length limit, all the query suggestions are selected. At step 460, the selected query suggestions are presented to the user, for example, in a query suggestion presentation area.

Figure 5:
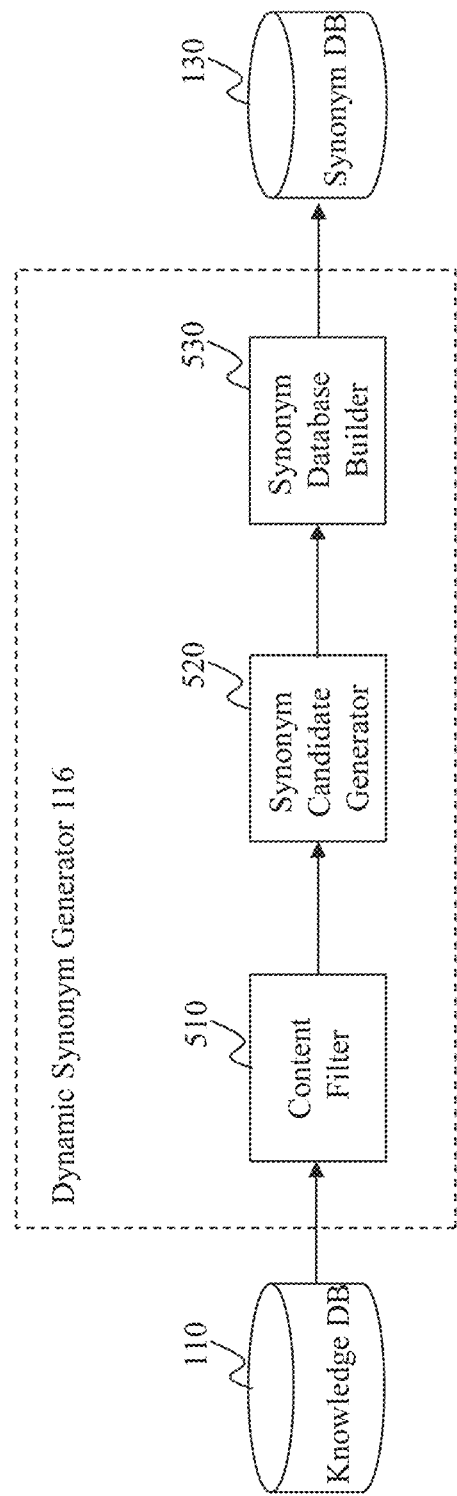
FIG. 5 illustrates an exemplary diagram of a dynamic synonym generator, according to an embodiment of the present teaching.

FIG. 5 illustrates an exemplary diagram of the dynamic synonym generator 116, according to an embodiment of the present teaching. In some examples, the dynamic synonym generator 116 may be included in the query suggestion generator 140 as shown in FIGS. 1A, 1B, 2A, and 2B. In some examples, the dynamic synonym generator 116 may be a standalone device connected to the network 106 as shown in FIGS. 1C, 1D, 2C, and 2D. The dynamic synonym generator 116 in this example includes a content filter 510, a synonym candidate generator 520, and a synonym database builder 530.

The content filter 510 obtains a portion of previously submitted search queries from the knowledge database 110. In an embodiment, the portion of previously submitted search queries satisfies one or more predetermined rules. For example, the portion of previously submitted search queries was submitted within a specific period of time (e.g., within one year). For another example, the portion of previously submitted search queries does not include inappropriate materials. For example, the portion of previously submitted search queries does not include violence related materials, adultery related materials, etc.

The synonym candidate generator 520 generates a plurality of synonym candidates based on the portion of previously submitted queries. More details about the synonym candidate generator 520 will be described in greater detail in FIGS. 7-8.

The synonym database builder 530 builds or updates the synonym DB 130. The synonym database builder 530 may further output the synonym DB 130 to be used in the exemplary systems FIGS. 1A-1D and FIGS. 2A-2D for providing query suggestions. More details about the synonym database builder 530 will be described in greater detail in FIGS. 9-10.

Figure 6:
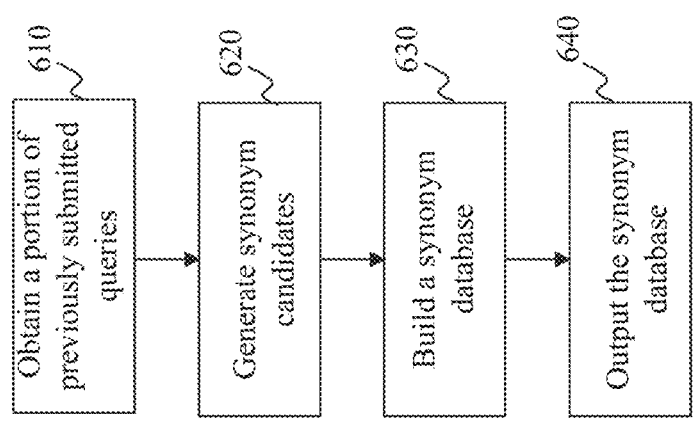
FIG. 6 is a flowchart of an exemplary process for building a synonym database, according to an embodiment of the present teaching.

FIG. 6 is a flowchart of an exemplary process for building a synonym database, according to an embodiment of the present teaching. The synonym database may be the synonym database 130 in FIGS. 1A-1D and FIGS. 2A-2D. In an embodiment, the exemplary process in FIG. 6 may be performed by the dynamic synonym generator 116.

At step 610, a portion of previously submitted search queries is obtained. In an embodiment, the portion of previously submitted search queries satisfies one or more predetermined rules. For example, the portion of previously submitted search queries was submitted within a specific period of time (e.g., within one year). For another example, the portion of previously submitted search queries does not include inappropriate materials. For example, the portion of previously submitted search queries does not include violence related materials, adultery related materials, etc. At step 620, a plurality of synonym candidates is generated based on the portion of previously submitted queries. At step 630, the synonym database is built or updated. At step 640, the synonym database is outputted.

Figure 7:
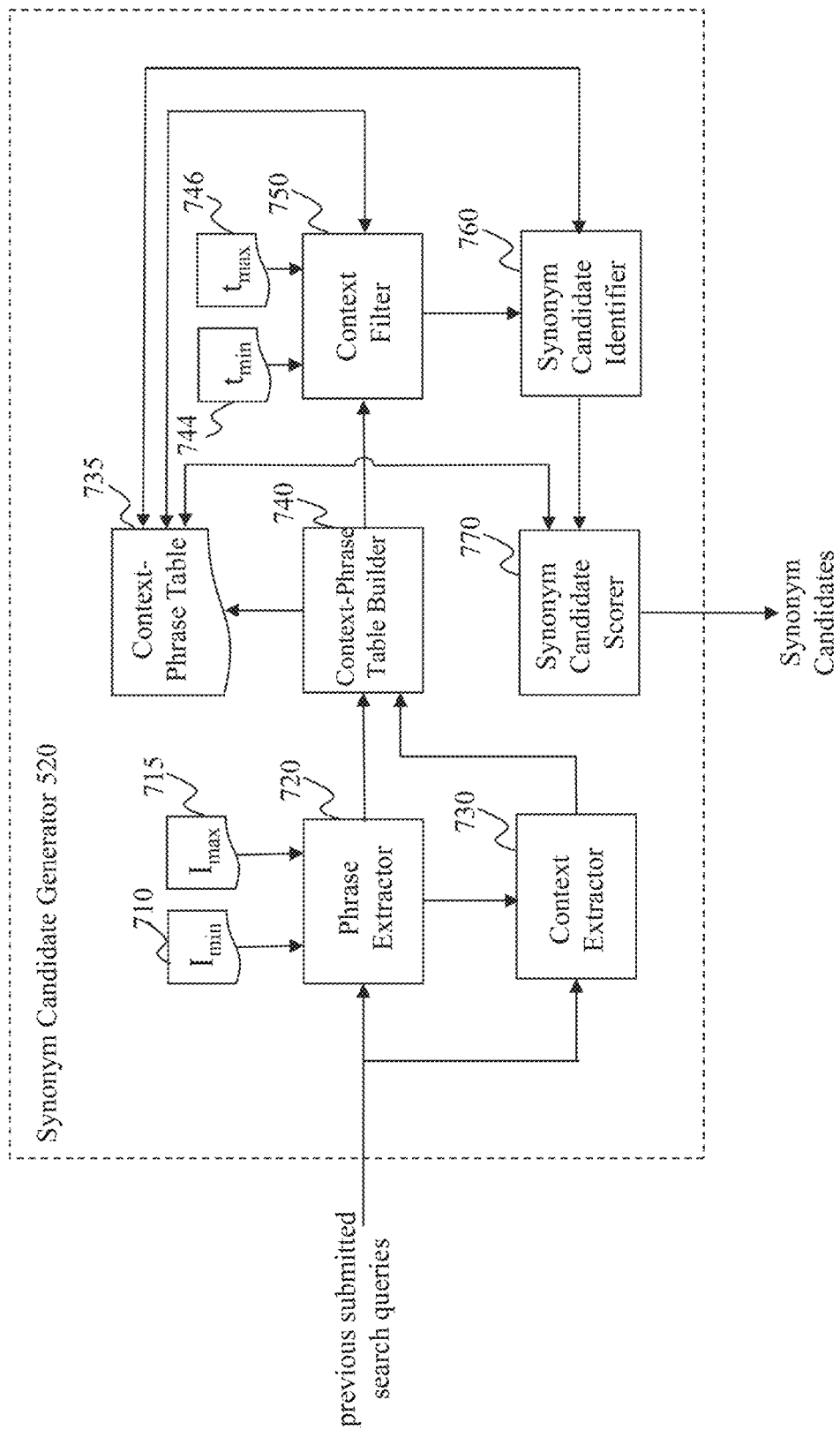
FIG. 7 illustrates an exemplary diagram of a synonym candidate generator, according to an embodiment of the present teaching.

FIG. 7 illustrates an exemplary diagram of the synonym candidate generator 520, according to an embodiment of the present teaching. The synonym candidate generator 520 may be included in the dynamic synonym generator 116 as shown in FIG. 5. The synonym candidate generator 520 in this example includes a phrase extractor 720, a context extractor 730, a context-phrase table builder 740, a context filter 750, a synonym candidate identifier 760, and a synonym candidate scorer 770.

Both the phrase extractor 720 and the context extractor 730 obtain a group of previously submitted search queries, for example, from the knowledge database 110. The group of previously submitted search queries may be the at least a portion of the plurality of previous submitted search queries as described in FIG. 5 and step 610 in FIG. 6. The phrase extractor 720 further extracts at least one phrase within a phrase length range from each of the group of previously submitted search query. The phrase length range may be represented by $[I_{min}, I_{max}]$, where $I_{min}$ 710 indicates the minimal phrase length, and $I_{max}$ 715 indicates the maximal phrase length. Accordingly, each of the at least one phrase may be a portion of the previously submitted search query within the length range. In an embodiment, the minimal phrase length and the maximal phrase length may refer to a minimal number of characters and a maximal number of characters in each phrase, respectively. In another embodiment, the minimal phrase length and the maximal phrase length may refer to a minimal number of words and a maximal number of words in each phrase, respectively. For example, the length range may be predefined as [2, 3], which may indicate each phrase includes two words or three words. An example previously submitted search query may be "I am Tom." Accordingly, each phrase may be a portion of the previously submitted search query, "I am Tom" having two words or three words. Therefore, two phrases may be extracted from the search query, i.e., "I am" and "am Tom."

The context extractor 730 extracted a respective context with respect to each extracted phrase in accordance with each of the group of previously submitted search queries. The respective context with respect to each extracted phrase may include the remaining text of the previously submitted search query excluding the phrase. In the same example query of "I am Tom," as described above, the respective context for the phrase "I am" is "X Tom." Similarly, the respective context for the phrase "am Tom" is "I X". The character "X" in either context represents the corresponding phrase.

The context-phrase table builder 740 updates a context-phrase table 735, e.g., based on the one or more pairs of each phrase and the respective context. In a hypothetical example, a group of previously submitted search queries includes "A B," "A C," "D B," "D C," and "D E." Accordingly, an example context-phrase table may be depicted in table 1 (e.g., when the phrase length range is [1,1]). The first column includes a plurality of contexts extracted from the group of previously submitted search queries. The second column, the third column, and the fourth column include the phrase(s) extracted from the group of previously submitted search queries that share(s) the respective context.

TABLE 1

An example context-phrase table

| Context | Phrase(s) | | |
|---|---|---|---|
| A X | B | C | |
| D X | B | C | E |
| X B | A | D | |
| X C | A | D | |
| X E | D | | |

The context filter 750 determines a context length for each context in the context-phrase table 735. In an embodiment, the context length represents a number of words in the context. In an embodiment, the context length represents a number of characters in the context. The context filter 750 further removes each context whose context length falls out of a predetermined context length range from the context-phrase table 735 along with the associated phrases. In an embodiment, the predetermined context length range may be represented by $[t_{min}, t_{max}]$, where $t_{min}$ 744 indicates the minimal context length, and $t_{max}$ 746 indicates the maximal context length. In an embodiment, the minimal context length and the maximal context length may refer to a minimal number of characters and a maximal number of characters in each context, respectively. In another embodiment, the minimal phrase length and the maximal phrase length may refer to a minimal number of words and a maximal number of words in each context, respectively.

The synonym candidate identifier 760 identifies a group of synonym candidates for each phrase, e.g., based on the context-phrase table 735. The group of synonym candidates for each phrase may include one or more phrases in the context-phrase table each shares one or more same contexts with the phrase. For example, table 2 shows a group of synonym candidates for each phrase as shown in table 1. The number besides each of the synonym candidates indicates a number of contexts that the synonym candidate shares with the respective phrase. For example, as shown in table 2, with respect to phrase "A," a first group of synonym candidate includes "D," which shares two contexts with "A" as indicated in table 1. With respect to phrase "B," a second group of synonym candidates includes "C" and "E." "C" shares two contexts with "B," and "E" shares one context with "B" as indicated in table 1. Within respect to phrase "C," a third group of synonym candidates includes "B" and "E." "B" shares two contexts with "C," and "E" shares one context with "C" as indicated in table 1. With respect to phrase "D," a fourth group of synonym candidates includes "A," which shares two contexts with "D." With respect to phrase "E," a fifth group of synonym candidates includes "B" and "C," both of which share one context with "E."

TABLE 2 a group of synonym candidates for each phrase

| Phrase | Synonym Candidate(s) | |
|---|---|---|
| A | D(2) | |
| B | C(2) | E(1) |
| C | B(2) | E(1) |
| D | A(2) | |
| E | B(1) | C(1) |

The synonym candidate scorer 770 calculates one or more scores for one or more synonym candidates in each group of synonym candidates, e.g., based on the number of contexts shared with the respective phrase. For example, as shown in table 2, in the second group of synonym candidates, "C" shares more contexts with "B" than "E." Therefore, in the second group, "C" has a higher score than "E." In the fifth group of synonym candidates, since "B" and "C" share the same number of contexts with "E," "B" and "C" therefore have same scores. The synonym candidate scorer 770 further outputs the group of synonym candidates (e.g., as shown in table 2) for each phrase.

Figure 8:
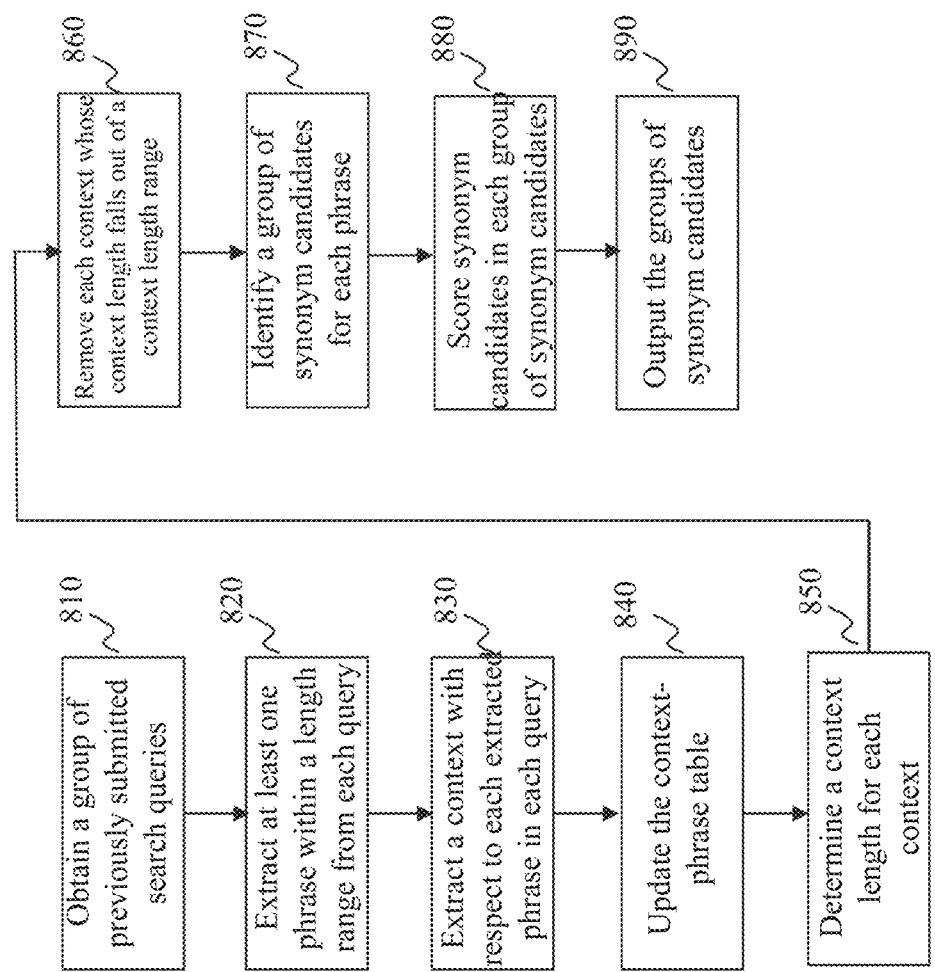
FIG. 8 is a flowchart of an exemplary process for generating synonym candidates, according to an embodiment of the present teaching.

FIG. 8 is a flowchart of an exemplary process for generating synonym candidates, according to an embodiment of the present teaching. The exemplary process in FIG. 8 may be performed by the synonym candidate generator 520 as shown in FIG. 5.

At step 810, a group of previously submitted search queries is obtained. The group of previously submitted search queries may be the at least a portion of the plurality of previous submitted search queries as described in FIG. 5 and step 610 in FIG. 6. At step 820, at least one phrase within a phrase length range is extracted from each of the group of previously submitted search query. The phrase length range may be represented by $[I_{min}, I_{max}]$, where $I_{min}$ indicates the minimal phrase length, and $I_{max}$ indicates the maximal phrase length. Accordingly, each of the at least one phrase may be a portion of the previously submitted search query within the length range. In an embodiment, the minimal phrase length and the maximal phrase length may refer to a minimal number of characters and a maximal number of characters in each phrase, respectively. In another embodiment, the minimal phrase length and the maximal phrase length may refer to a minimal number of words and a maximal number of words in each phrase, respectively. For example, the length range may be predefined as [2, 3], which may indicate each phrase includes two words or three words.

At step 830, a respective context is extracted with respect to each extracted phrase in each of the group of previously submitted search queries. The respective context with respect to each extracted phrase may include the remaining text of the previously submitted search query excluding the phrase. In the same example query of "I am Tom," as described above, the respective context for the phrase "I am" is "X Tom." Similarly, the respective context for the phrase "am Tom" is "I X". The character "X" in either context represents the corresponding phrase.

At step 840, a context-phrase table is updated, e.g., based on the one or more pairs of each phrase and the respective context. In the hypothetical example as described above, a group of previously submitted search queries includes "A B," "A C," "D B," "D C," and "D E." Accordingly, an example context-phrase table may be depicted in table 1 (e.g., when the phrase length range is [1,1]). The first column includes a plurality of contexts extracted from the group of previously submitted search queries. The second column and the third column include the phrase(s) extracted from the group of previously submitted search queries that share(s) the respective context.

At step 860, a context length is determined for each context in the context-phrase table. In an embodiment, the context length represents a number of words in the context. In an embodiment, the context length represents a number of characters in the context. At step 870, each context whose context length falls out of a predetermined context length range is removed from the context-phrase table along with the associated phrases. In an embodiment, the predetermined context length range may be represented by $[t_{min}, t_{max}]$, where $t_{min}$ indicates the minimal context length, and $t_{max}$ indicates the maximal context length. In an embodiment, the minimal context length and the maximal context length may refer to a minimal number of characters and a maximal number of characters in each context, respectively. In another embodiment, the minimal phrase length and the maximal phrase length may refer to a minimal number of words and a maximal number of words in each context, respectively.

At step 870, a group of synonym candidates is identified for each phrase, e.g., based on the context-phrase table. The group of synonym candidates for each phrase may include one or more phrases in the context-phrase table that share one or more same contexts with the phrase. For example, table 2 shows a group of synonym candidates for each phrase as shown in table 1. The number besides each of the synonym candidates indicates a number of contexts that the synonym candidate shares with the respective phrase. For example, as shown in table 2, with respect to phrase "A," a first group of synonym candidate includes "D," which shares two contexts (as indicated in table 1) with "A." With respect to phrase "B," a second group of synonym candidates includes "C" and "E." "C" shares two contexts with "B," and "E" shares one context with "B" as indicated in table 1. Within respect to phrase "C," a third group of synonym candidates includes "B" and "E." "B" shares two contexts with "C," and "E" shares one context with "C" as indicated in table 1. With respect to phrase "D," a fourth group of synonym candidates includes "A," which shares two contexts with "D." With respect to phrase "E," a fifth group of synonym candidates includes "B" and "C," both of which share one context with "E."

At step 880, one or more synonym candidates in each group of synonym candidates are scored, e.g., based on the number of contexts shared with the respective phrase. For example, as shown in table 2, in the second group of synonym candidates, "C" shares more contexts with "B" than "E." Therefore, in the second group, "C" has a higher score than "E." In the fifth group of synonym candidates, since "B" and "C" share the same number of contexts with "E," "B" and "C" therefore have same scores. At step 890, the group of synonym candidates (e.g., as shown in table 2) for each phrase is outputted.

Figure 9:
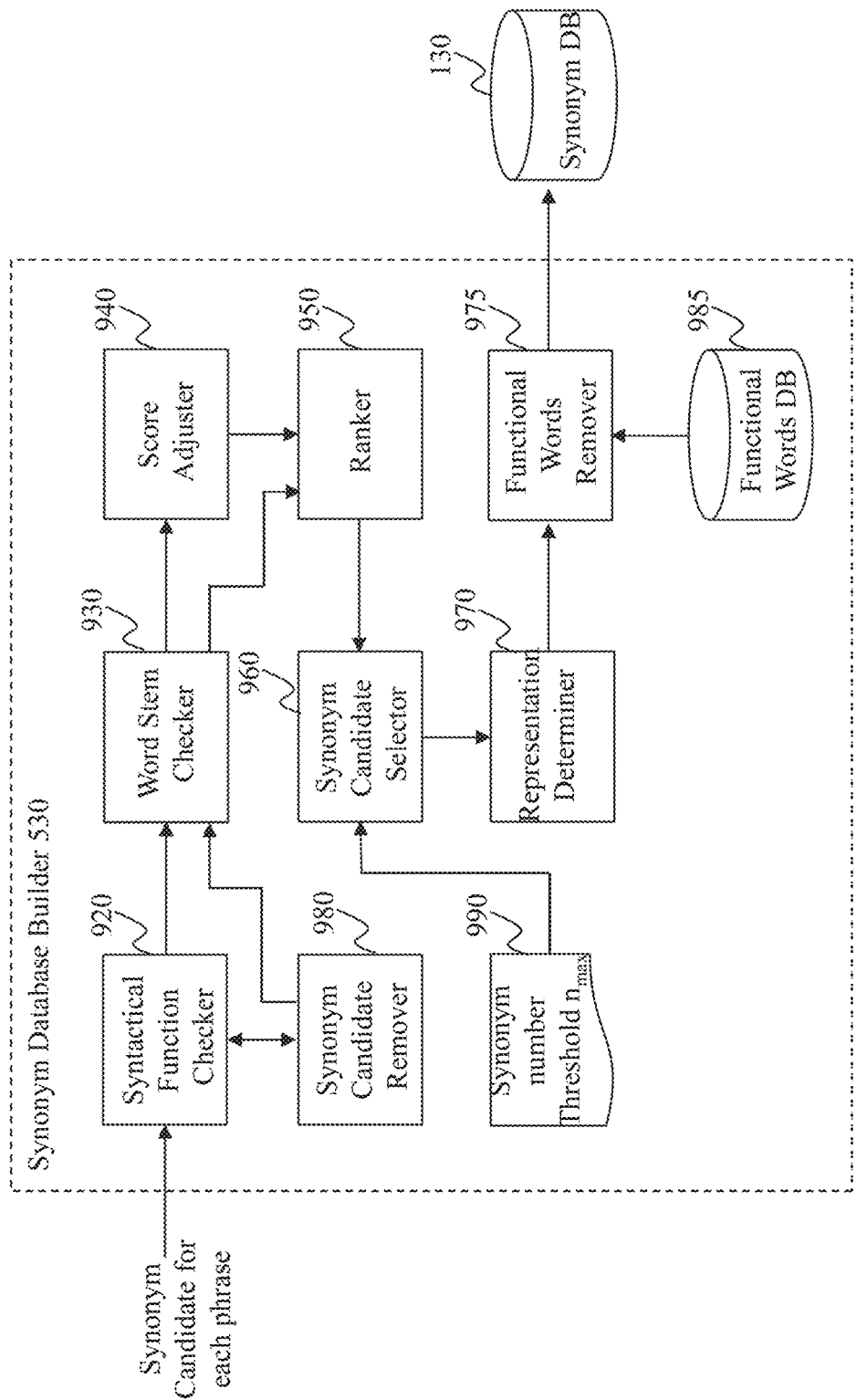
FIG. 9 illustrates an exemplary diagram of a synonym database builder, according to an embodiment of the present teaching.

FIG. 9 illustrates an exemplary diagram of the synonym database builder 530, according to an embodiment of the present teaching. The synonym database builder 530 may be included in the dynamic synonym generator 116 as shown in FIG. 5. The synonym database builder 530 in this example includes a syntactical function checker 920, a synonym candidate remover 980, a word stem checker 930, a score adjuster 940, a ranker 950, a synonym candidate selector 960, a representation determiner 970, a functional words remover 975, and a functional words database 985.

The syntactical function checker 920 obtains a group of synonym candidates for each phrase, and performs a syntactical function check with respect to the group of synonym candidates for each phrase, e.g., to determine the syntactical function for each synonym candidate within each group.

The synonym candidate remover 980 removes, in each group of synonym candidates, one or more synonym candidates having different syntactical functions from the respective phrase from the group. For example, if the phrase is a verb, one or more non-verb synonym candidates from the group of synonym candidates for the phrase are removed.

The word stem checker 930 performs a word stem check for each group of synonym candidate. The word stem checker 930 further determines whether one or more synonym candidates in the group include the same word stems as the respective phrase. For example, "fish," "fishes," "fishing" include the same word stem of "fish." If so, the word stem checker 930 instructs the score adjuster 940 to operate. Otherwise, the word stem checker 930 instructs the ranker 950 to operate.

The score adjuster 940 adjusts the scores associated with the one or more synonym candidates having the same word stems. For example, the score adjuster 940 reduces the scores associated with the one or more synonym candidates by a certain percentage. The ranker 950 ranks the group of synonym candidates for each phrase based on the scores associated with the group of synonym candidates.

The synonym candidate selector 960 selects up to a predetermined number of synonym candidates from the group for each phrase based on the ranking. Sometimes, the predetermined number of synonym candidates may be referred to as a synonym number threshold 990 denoted by $n_{max}$. The representation determiner 970 determines a representation for the selected synonym candidates with respect to each phrase. In an embodiment, the representation is one of the selected synonym candidates with respect to each phrase. For examples, a group of synonym candidates for phrase "picture" includes "image," "pic," etc. Accordingly, "Image" or "pic" may be selected as the representation with respect to the phrase "picture."

The functional words remover 975 removes one or more functional works from the selected synonym candidates with respect to each phrase to obtain the synonyms for each phrase. In an embodiment, the one or more functional words may be identified from the functional words database 985. The one or more functional words may include, but are not limited to "an," "a," "the," etc. The functional words remover 985 further stores the synonyms for each phrase in the synonym database 130.

Figure 10:
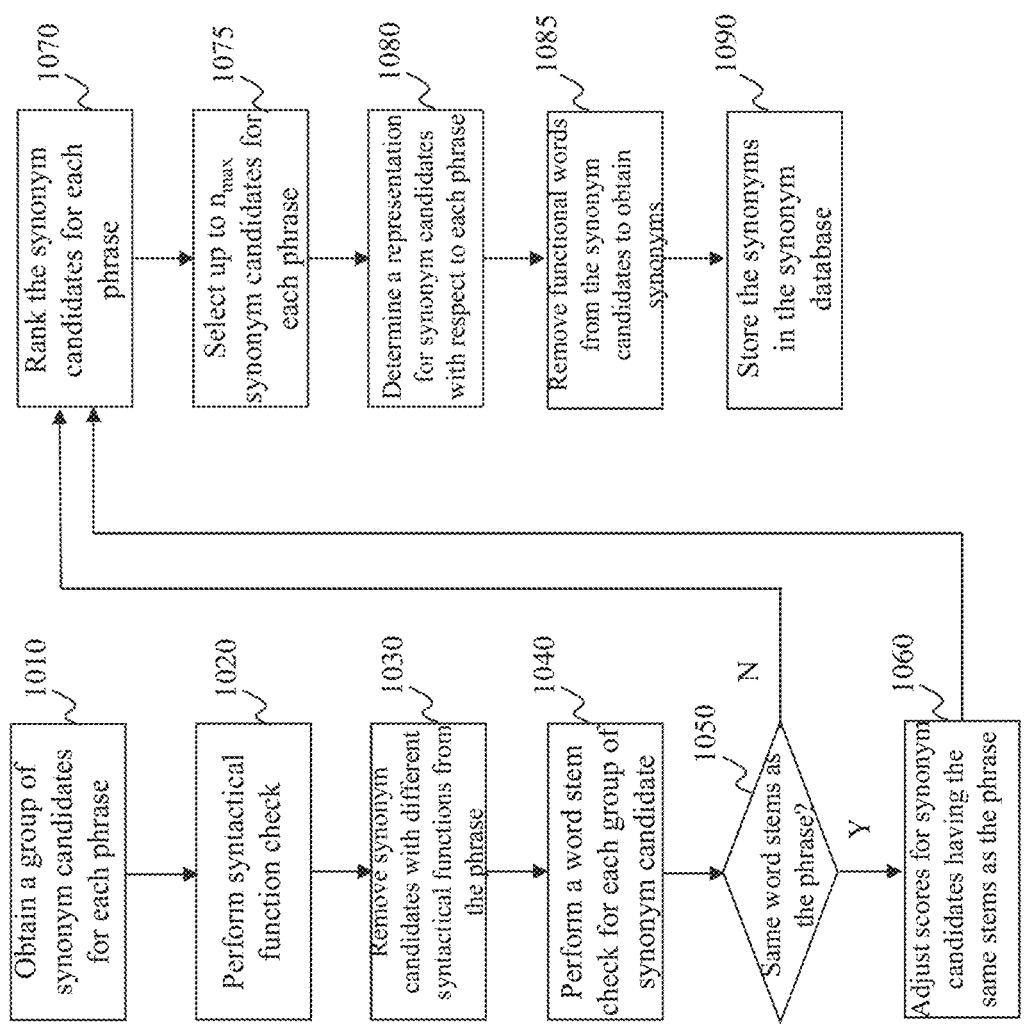
FIG. 10 is a flowchart of an exemplary process for determining and storing synonyms in the synonym database, according to an embodiment of the present teaching.

FIG. 10 is a flowchart of an exemplary process for determining and storing synonyms in the synonym database, according to an embodiment of the present teaching. The exemplary process as shown in FIG. 10 may be performed by the synonym database builder 530.

At step 1010, a group of synonym candidates for each phrase is obtained. At step 1020, a syntactical function check is performed with respect to the group of synonym candidates for each phrase, e.g., to determine the syntactical function for each synonym candidate within each group. At step 1030, in each group of synonym candidates, one or more synonym candidates having different syntactical functions from the respective phrase are removed from the group. For example, if the phrase is a verb, one or more non-verb synonym candidates from the group of synonym candidates for the phrase are removed. At step 1040, a word stem check is performed for each group of synonym candidate. At step 1050, it is determined whether one or more synonym candidates in the group include the same word stems as the respective phrase. For example, "fish," "fishes," "fishing" include the same word stem of "fish." If so, the process proceeds to step 1060. Otherwise, the process proceeds to step 1070.

At step 1060, the associated scores with the one or more synonym candidates having the same word stems are adjusted, for example, reduced by a certain percentage. At step 1070, the group of synonym candidates for each phrase is ranked based on the scores associated with the group of synonym candidates. At step 1075, up to a predetermined number of synonym candidates are selected from the group for each phrase based on the ranking. Sometimes, the predetermined number of synonym candidates may be referred to as a synonym number threshold denoted as $n_{max}$. At step 1080, a representation is determined for the selected synonym candidates with respect to each phrase. In an embodiment, the representation is one of the selected synonym candidates with respect to each phrase. For examples, a group of synonym candidates for phrase "picture" includes "image," "pic," etc. Accordingly, "Image" or "pic" may be selected as the representation with respect to the phrase "picture."

At step 1085, one or more functional works are removed from the selected synonym candidates with respect to each phrase to obtain the synonyms for each phrase. The one or more functional words may include, but are not limited to "an," "a," "the," etc. At step 1090, the synonyms for each phrase are stored in the synonym database.

Figure 11:
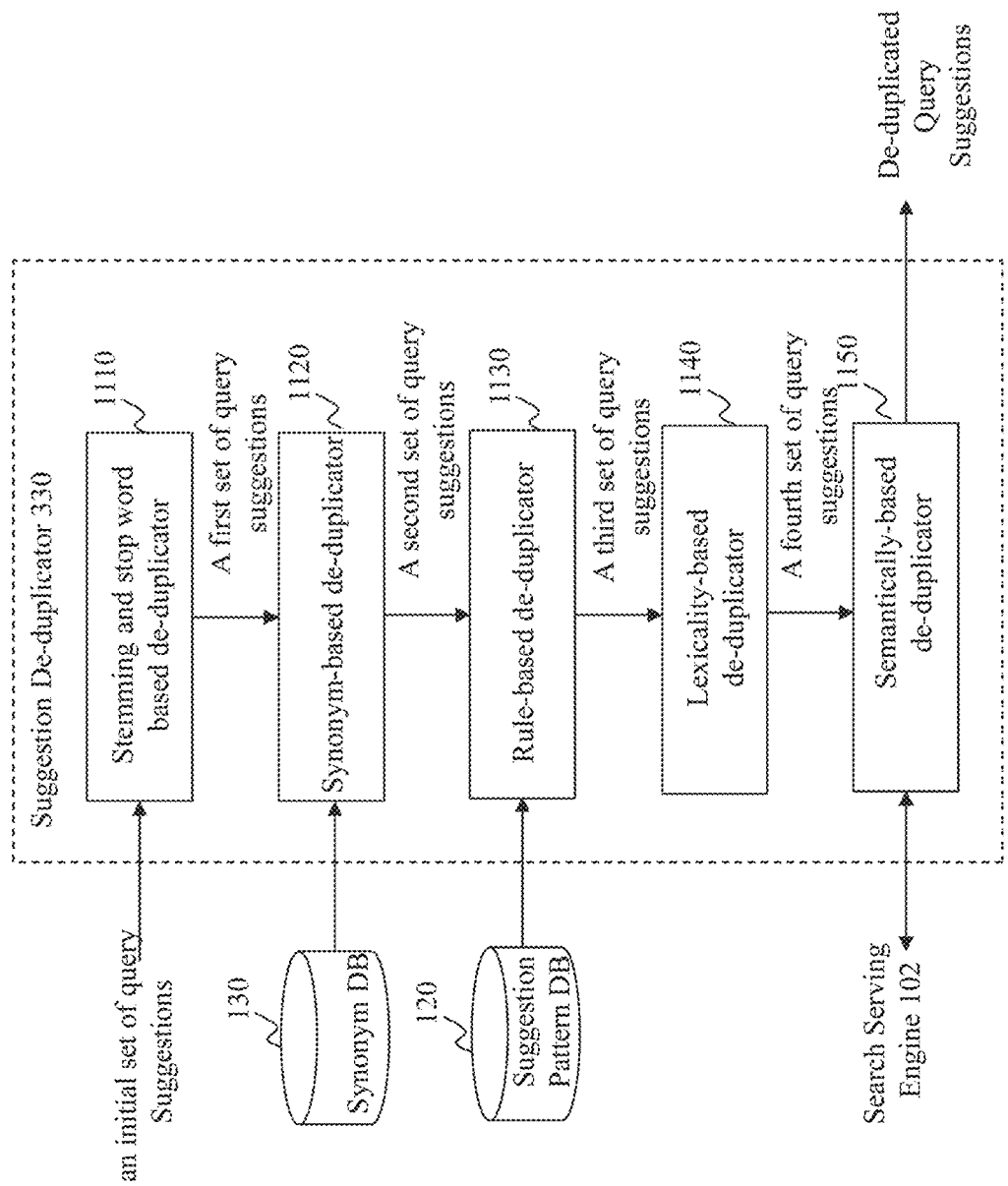
FIG. 11 illustrates an exemplary diagram of a suggestion de-duplicator, according to an embodiment of the present teaching.

FIG. 11 illustrates an exemplary diagram of the suggestion de-duplicator 330, according to an embodiment of the present teaching. The suggestion de-duplicator 330 may be included in the query suggestion engine 104 as shown in FIGS. 1A-1D, 2A-2D, and FIG. 3. The suggestion de-duplicator 330 in this example includes a stemming and stop word based de-duplicator 1110, a synonym-based de-duplicator 1120, a rule-based de-duplicator 1130, a lexicality-based de-duplicator 1140, and a semantically-based de-duplicator 1150. The various components of the suggestion de-duplicator 330 may be arranged as shown or in any other suitable manner.

The stemming and stop word based de-duplicator 1110 obtains an initial set of query suggestions, and performs stemming and stop word based de-duplication with respect to the initial set of query suggestions to obtain a first set of query suggestions. The stop word means any functional word such as "an," "a," "the," etc. Specifically, stemming and stop word based de-duplication is performed to remove one or more query suggestions from the initial set of query suggestions to obtain the first set of query suggestions. In an embodiment, the one or more removed query suggestions include at least one query suggestion that shares the same stem as at least one of the first set of query suggestion. In an embodiment, the one or more removed query suggestions include at least one query suggestion that is identical with at least one of the first set of query suggestions after one or more stop words are removed from the at least one query suggestion.

The synonym-based de-duplicator 1120 is coupled to the synonym database 130 and performs a synonym-based de-duplication with respect to the first set of query suggestions to obtain a second set of query suggestions. More details about the synonym-based de-duplication and the synonym-based de-duplicator 1120 will be described in great detail in FIGS. 13-14.

The rule-based de-duplicator 1130 is coupled to the suggestion pattern database 120 and performs a rule-based de-duplication with respect to the second set of query suggestions to obtain a third set of query suggestions. More details about the rule-based de-duplication and the rule-based de-duplicator 1130 will be described in great detail in FIGS. 15-18.

The lexicality-based de-duplicator 1140 performs a lexicality-based de-duplication with respect to the third set of query suggestions to obtain a fourth set of query suggestions. More details about the lexicality-based de-duplication and the lexicality-based de-duplicator 1140 will be described in great detail in FIGS. 19-20.

The semantically-based de-duplicator 1150 is coupled to the search serving engine 102 and performs a semantics-based de-duplication with respect to the fourth set of query suggestions to obtain de-duplicated query suggestions. More details about the semantics-based de-duplication and the semantically-based de-duplicator 1150 will be described in great detail in FIGS. 21-22. The semantically-based de-duplicator 1150 further outputs the de-duplicated query suggestions, for example, to the suggestion ranker 342 in the query suggestion engine 104 as shown in FIG. 3.

Figure 12:
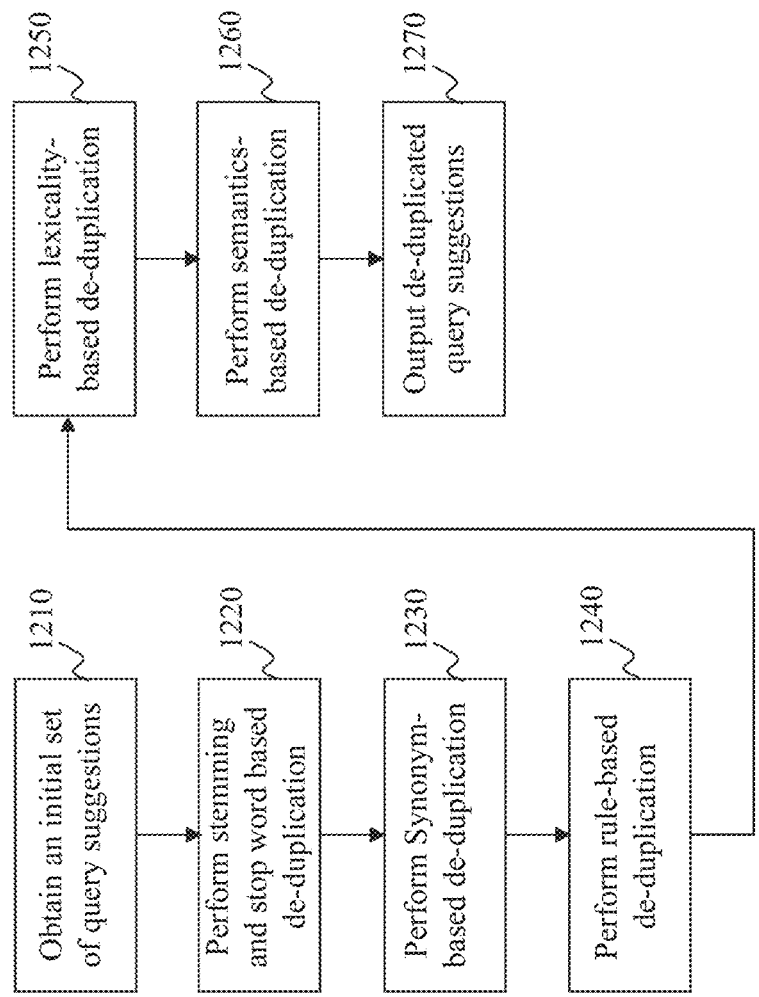
FIG. 12 is a flowchart of an exemplary process for de-duplicating query suggestions, according to an embodiment of the present teaching.

FIG. 12 is a flowchart of an exemplary process for de-duplicating query suggestions, according to an embodiment of the present teaching. The exemplary process in FIG. 12 may be performed by the suggestion de-duplicator 330 in FIG. 11. The orders of performing steps 1220-1260 may be interchangeable.

At step 1210, an initial set of query suggestions is obtained. At step 1220, stemming and stop word based de-duplication is performed with respect to the initial set of query suggestions to obtain a first set of query suggestions. The stop word means any functional word such as "an," "a," "the," etc. Specifically, stemming and stop word based de-duplication is performed to remove one or more query suggestions from the initial set of query suggestions to obtain the first set of query suggestions. In an embodiment, the one or more removed query suggestions include at least one query suggestion that shares the same stem as at least one of the first set of query suggestion. In an embodiment, the one or more removed query suggestions include at least one query suggestion that is identical with at least one of the first set of query suggestions after one or more stop words are removed from the at least one query suggestion.

At step 1230, a synonym-based de-duplication is performed with respect to the first set of query suggestions to obtain a second set of query suggestions. More details about the synonym-based de-duplication will be described in great detail in FIGS. 13-14.

At step 1240, a rule-based de-duplication is performed with respect to the second set of query suggestions to obtain a third set of query suggestions. More details about the rule-based de-duplication will be described in great detail in FIGS. 15-18.

At step 1250, a lexicality-based de-duplication is performed with respect to the third set of query suggestions to obtain a fourth set of query suggestions. More details about the lexicality-based de-duplication will be described in great detail in FIGS. 19-20.

At step 1260, a semantics-based de-duplication is performed with respect to the fourth set of query suggestions to obtain de-duplicated query suggestions. More details about the semantics-based de-duplication will be described in great detail in FIGS. 21-22. At step 1270, the de-duplicated query suggestions are outputted, for example, to the suggestion ranker 342 in the query suggestion engine 104 as shown in FIG. 3.

Figure 13:
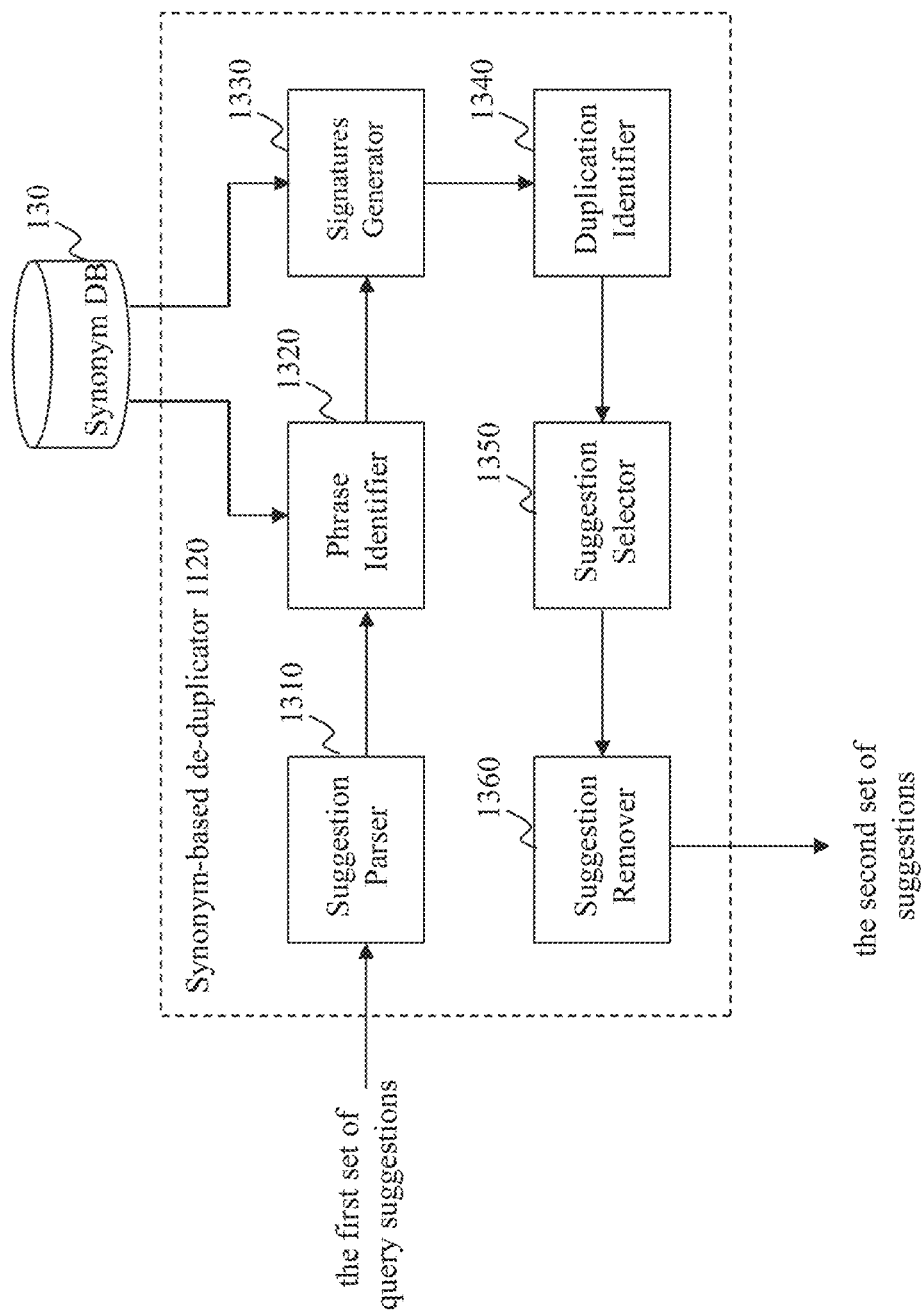
FIG. 13 illustrates an exemplary diagram of a synonym-based de-duplicator, according to an embodiment of the present teaching.

FIG. 13 illustrates an exemplary diagram of a synonym-based de-duplicator 1120, according to an embodiment of the present teaching. The synonym-based de-duplicator 1120 may be included in the suggestion de-duplicator 330 as shown in FIG. 11. The synonym-based de-duplicator 1120 in this example includes a suggestion parser 1310, a phrase identifier 1320, a signature generator 1330, a duplication identifier 1340, a suggestion selector 1350, and a suggestion remover 1360.

The suggestion parser 1310 parses each of the first set of query suggestions to a plurality of phrases. The phrase identifier 1320 identifies one or more phrases stored in the synonym database 130 from the plurality of phrases in each of the first set of query suggestions. Each of the one or more phrases has one or more synonyms and a representation for the one or more synonyms in the synonym database 130.

The signature generator 1330 generates one or more signatures, for each of the first set of query suggestions, based on the identified one or more phrases and the representations in the synonym database 130. In an embodiment, each of the one or more signatures with respect to a query suggestion is generated by replacing at least one of the identified one or more phrases in the query suggestion with the corresponding at least one representation. For example, a signature with respect to a query suggestion "butterfly image" may be generated by replacing the phrase "image" with a representation of the one or more synonyms of "image" in the synonym database 130. As described above, the representation of the one or more synonyms of "image" may be one of the one or more synonyms, e.g., "pic." Therefore, the signature of the query suggestion "butterfly image" may be "butterfly pic."

The duplication identifier 1340 identifies one or more groups of query suggestions each having a same signature from the first set of query suggestions. The suggestion selector 1350 selects one query suggestion in each group. The suggestion remover 1360 removes the unselected one or more query suggestions from each group. The suggestion remover 1360 further outputs the remaining query suggestions from the first set of query suggestions as the second set of query suggestions.

Figure 14:
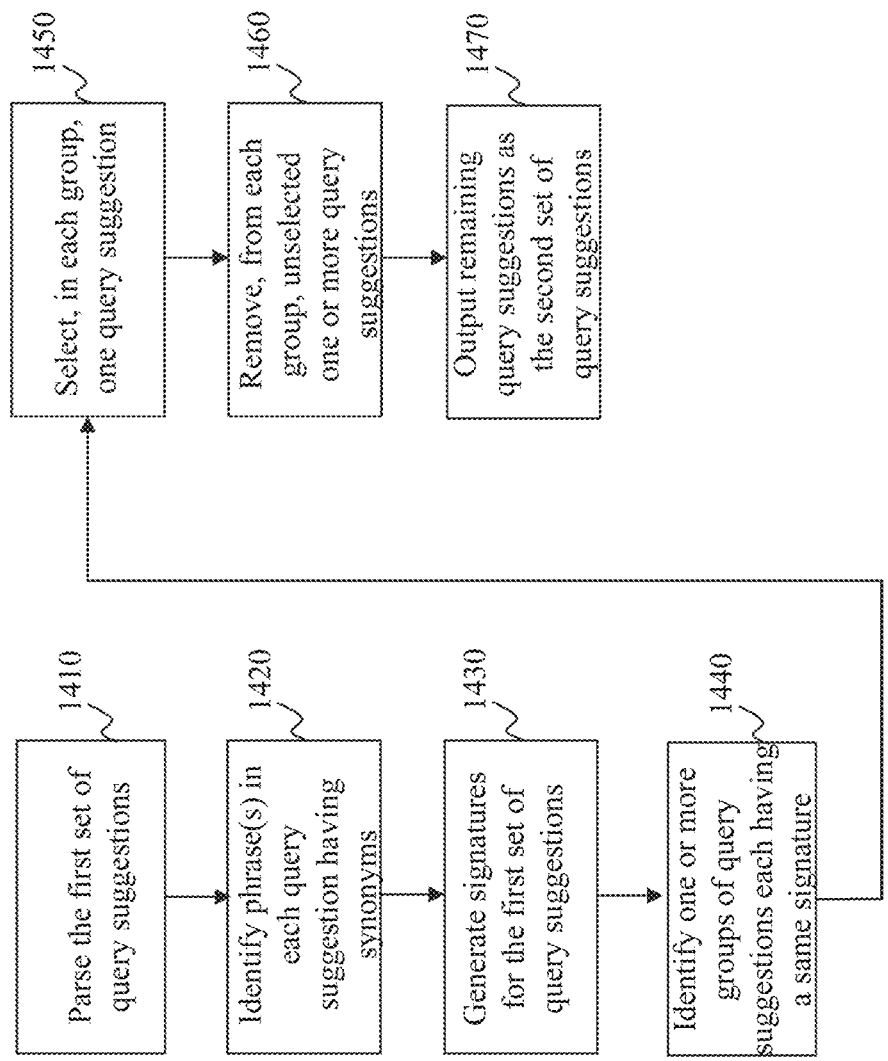
FIG. 14 is a flowchart of an exemplary process for synonym-based deduplication, according to an embodiment of the present teaching.

FIG. 14 is a flowchart of an exemplary process for synonym-based deduplication, according to an embodiment of the present teaching. The exemplary process as shown in FIG. 14 may be performed by the synonym-based de-duplicator 1120.

At step 1410, each of the first set of query suggestions is parsed to a plurality of phrases. At step 1420, one or more phrases stored in the synonym database are identified from the plurality of phrases in each of the first set of query suggestions. Each of the one or more phrases has one or more synonyms and a representation for the one or more synonyms in the synonym database. At step 1430, one or more signatures are generated, for each of the first set of query suggestions, based on the identified one or more phrases and the representations. In an embodiment, each of the one or more signatures with respect to a query suggestion is generated by replacing at least one of the identified one or more phrases in the query suggestion with the corresponding at least one representation. For example, a signature with respect to a query suggestion "butterfly image" may be generated by replacing the phrase "image" with a representation of the one or more synonyms of "image" in the synonym database. As described above, the representation of the one or more synonyms of "image" may be one of the one or more synonyms, e.g., "pic." Therefore, the signature of the query suggestion "butterfly image" may be "butterfly pic."

At step 1440, one or more groups of query suggestions each having a same signature are identified, from the first set of query suggestions. At step 1450, one query suggestion is selected in each group. At step 1460, the unselected one or more query suggestions are removed from each group. At step 1470, the remaining query suggestions from the first set of query suggestions are outputted as the second set of query suggestions.

Figure 15:
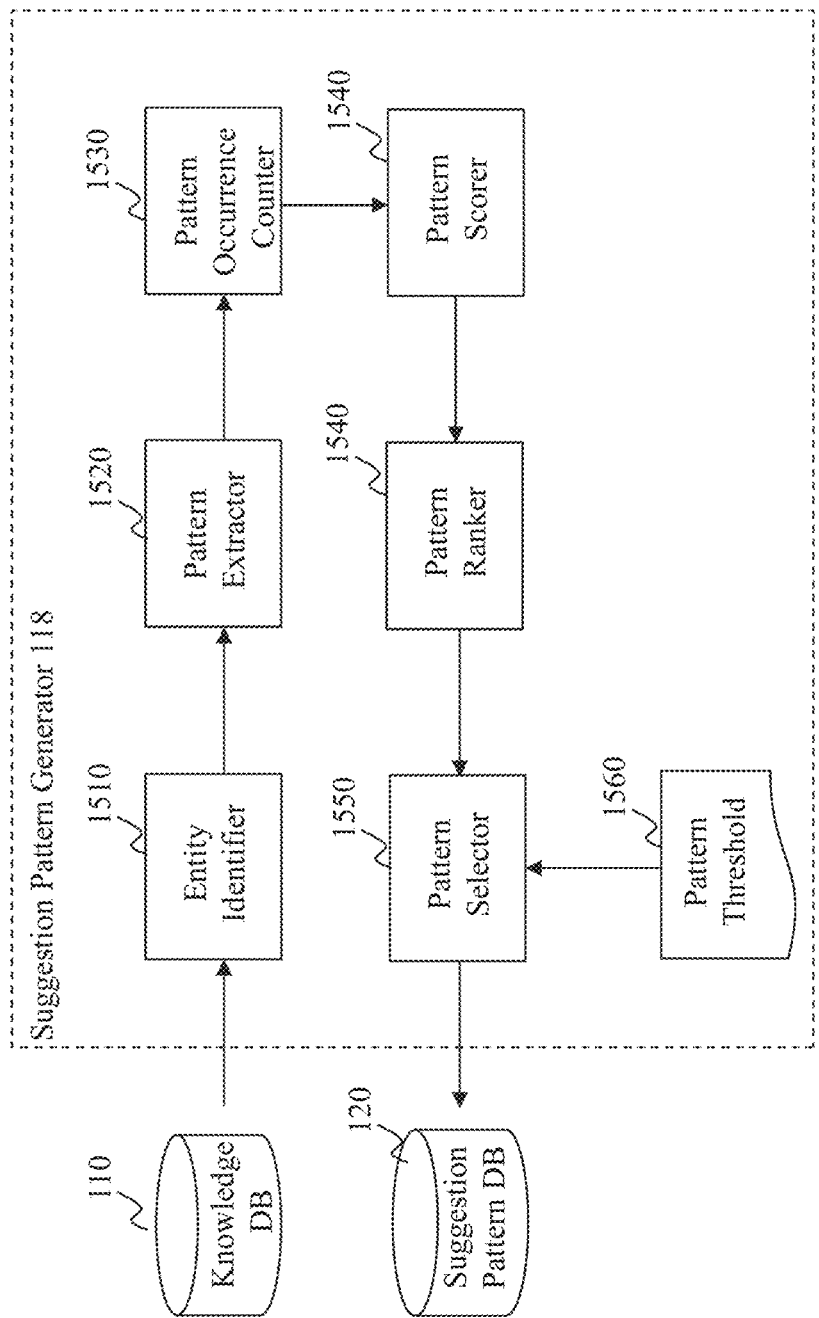
FIG. 15 illustrates an exemplary diagram of a suggestion pattern generator, according to an embodiment of the present teaching.

FIG. 15 illustrates an exemplary diagram of the suggestion pattern generator 118, according to an embodiment of the present teaching. In some examples, the pattern database generator 118 may be included in the query suggestion generator 140 as shown in FIGS. 1A, 1C, 2A, and 2C. In some examples, the pattern database generator 118 may be a standalone device connected to the network 106 as shown in FIGS. 1B, 1D, 2B, and 2D. The suggestion pattern generator 118 in this example includes an entity identifier 1510, a pattern extractor 1520, a pattern occurrence counter 1530, a pattern ranker 1540, and a pattern selector 1550.

The entity identifier 1510 determines a group of previously submitted search queries from a plurality of previously submitted search queries stored in the knowledge database 110. Each of the group of previously submitted search queries includes an entity. The entity may be a name, a person, an organization, a brand, a company, a product, etc.

The pattern extractor 1520 extracts a plurality of patterns from the group of previously submitted search queries. Each of the plurality of patterns is a portion of a respective previously submitted search query excluding the entity. The pattern occurrence counter 1530 determines a number of occurrences with respect to each of the plurality of patterns.

The pattern scorer 1540 calculates a score for each of the plurality of patterns, for example, based on the number of occurrences and/or a length with respect to each of the plurality of patterns. In an embodiment, a length of a pattern means a number of characters in the pattern.

The pattern ranker 1540 ranks the plurality of patterns based on the calculated scores. The pattern selector 1550 selects a group of patterns from the plurality of patterns based on the ranking. In an embodiment, the selected group of patterns includes one or more top ranked patterns from the plurality of patterns. In an embodiment, the group of patterns comprises a number of patterns below a predetermined pattern threshold 1560. The pattern selector 1550 further outputs the group of patterns to be stored in the suggestion pattern database 120.

Figure 16:
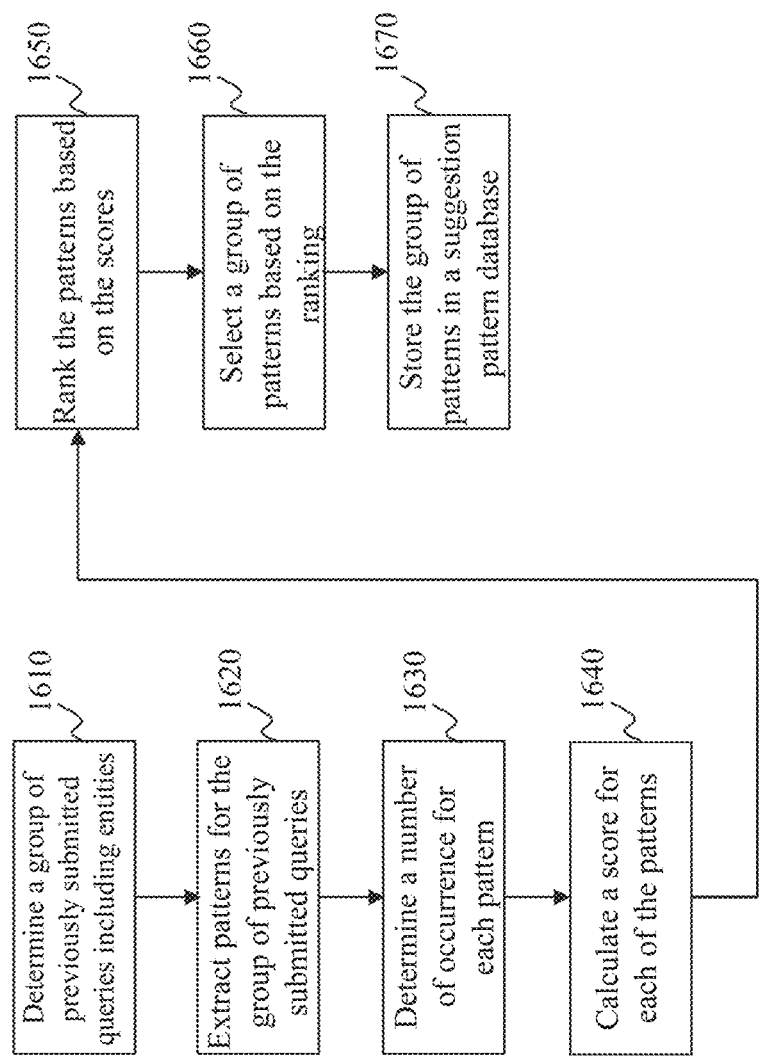
FIG. 16 is a flowchart of an exemplary process for building a suggestion pattern database, according to an embodiment of the present teaching.

FIG. 16 is a flowchart of an exemplary process for generating and storing suggestion patterns in the suggestion pattern database, according to an embodiment of the present teaching. The exemplary process in FIG. 16 may be performed by the suggestion pattern generator 118.

At step 1610, a group of previously submitted search queries are determined from a plurality of previously submitted search queries stored in the knowledge database 110. Each of the group of previously submitted search queries includes an entity. The entity may be a name, a person, an organization, a brand, a company, a product, etc. At step 1620, a plurality of patterns is extracted from the group of previously submitted search queries. Each of the plurality of patterns is a portion of a respective previously submitted search query excluding the entity.

At step 1630, a number of occurrences with respect to each of the plurality of patterns is determined. At step 1640, a score is calculated for each of the plurality of patterns, for example, based on the number of occurrences and/or a length with respect to each of the plurality of patterns. In an embodiment, a length of a pattern means a number of characters in the pattern.

At step 1650, the plurality of patterns is ranked based on the calculated scores. At step 1660, a group of patterns are selected from the plurality of patterns based on the ranking. In an embodiment, the selected group of patterns includes one or more top ranked patterns from the plurality of patterns. In an embodiment, the group of patterns comprises a number of patterns below a predetermined pattern threshold. At step 1670, the group of patterns is outputted to be stored in the suggestion pattern database.

Figure 17:
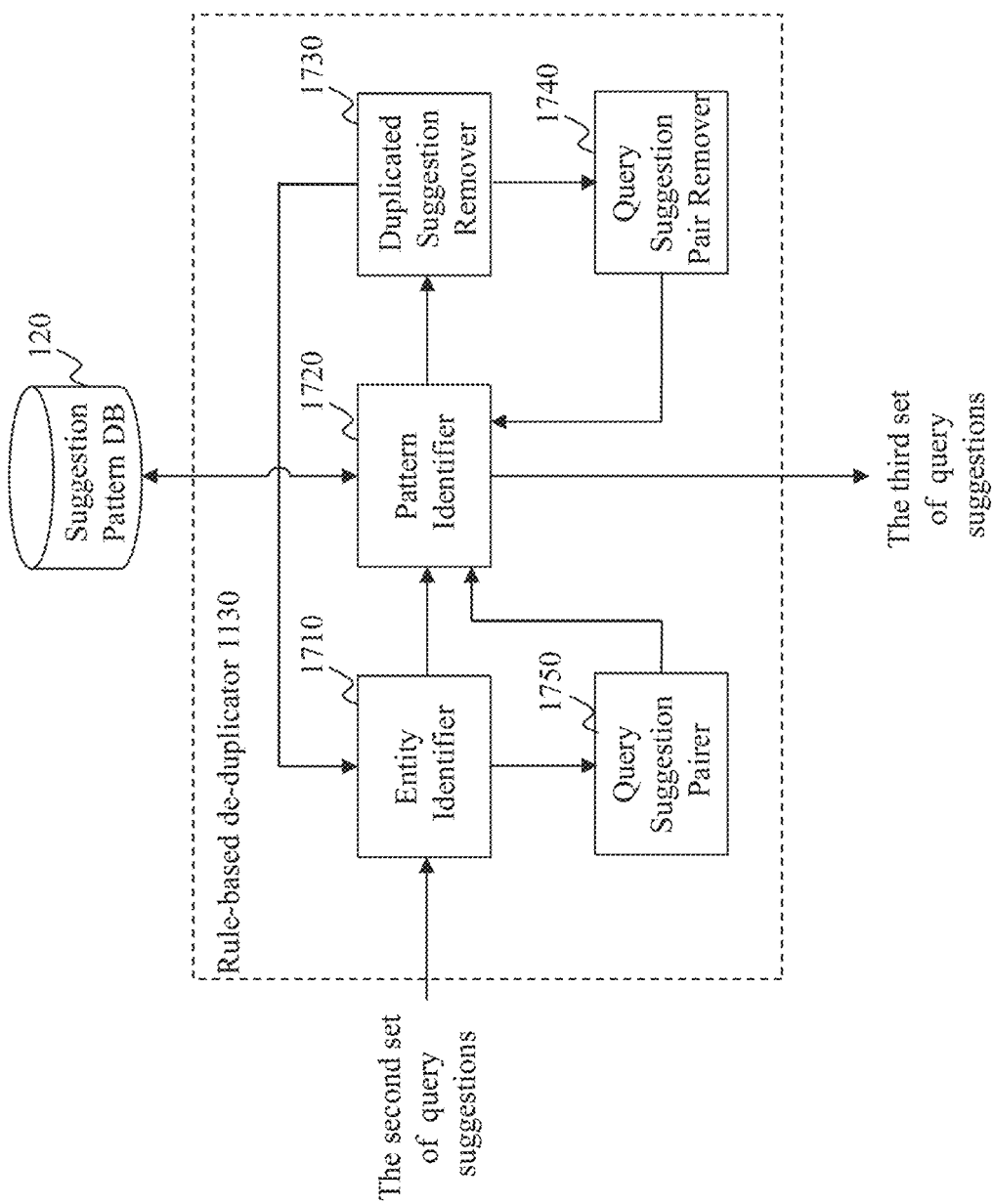
FIG. 17 illustrates an exemplary diagram of a rule-based de-duplicator, according to an embodiment of the present teaching.

FIG. 17 illustrates an exemplary diagram of the rule-based de-duplicator 1130, according to an embodiment of the present teaching. The rule-based de-duplicator 1130 may be included in the suggestion de-duplicator 330 as shown in FIG. 11. The rule-based de-duplicator 1130 in this example includes an entity identifier 1710, a pattern identifier 1720, a duplicated suggestion remover 1730, a query suggestion pair remover 1740, and a query suggestion pairer 1750.

The entity identifier 1710 obtains the second set of query suggestions are obtained. The entity identifier 1710 further determines whether there is a query suggestion from the second set of query suggestions starting with an entity. If so, a group of query suggestions each starting with the entity is selected from the second set of query suggestions. Otherwise, the entity identifier 1710 instructs to operate the query suggestion pairer 1750.

The pattern identifier 1720 determines whether a first rule is satisfied with respect to each of the selected group of query suggestions. For example, the first rule is satisfied when a portion of the query suggestion excluding the entity matches a first suggestion pattern from the suggestion pattern database. If so, the pattern identifier 1720 instructs to operate the duplicated suggestion remover 1730.

The duplicated suggestion remover 1730 removes one or more query suggestions from the selected group of query suggestions. In an embodiment, the first rule is satisfied with respect to each of the one or more query suggestions.

The query suggestion pairer 1750 pairs the remaining query suggestions from the second set of query suggestions. With respect to each pair of query suggestions, the pattern identifier 1720 further determines whether a second rule is satisfied in accordance with the pair of query suggestions. For example, the second rule is satisfied when a first query suggestion includes a second query suggestion in the same pair, and a portion of the first query suggestion that excludes the second query suggestion matches a second suggestion pattern in the suggestion pattern database. The second suggestion pattern may be the same as the first suggestion pattern, or different from the first suggestion pattern. If so, the duplicated suggestion remover 1730 removes the first query suggestion in the pair. Alternatively, the duplicated suggestion remover 1730 removes the second query suggestion in the pair. The query suggestion pair remover 1740 removes one or more pairs of query suggestions including the removed query suggestion. The pattern identifier 1720 further outputs the remaining query suggestions from the second set of query suggestions as the third set of query suggestions.

Figure 18:
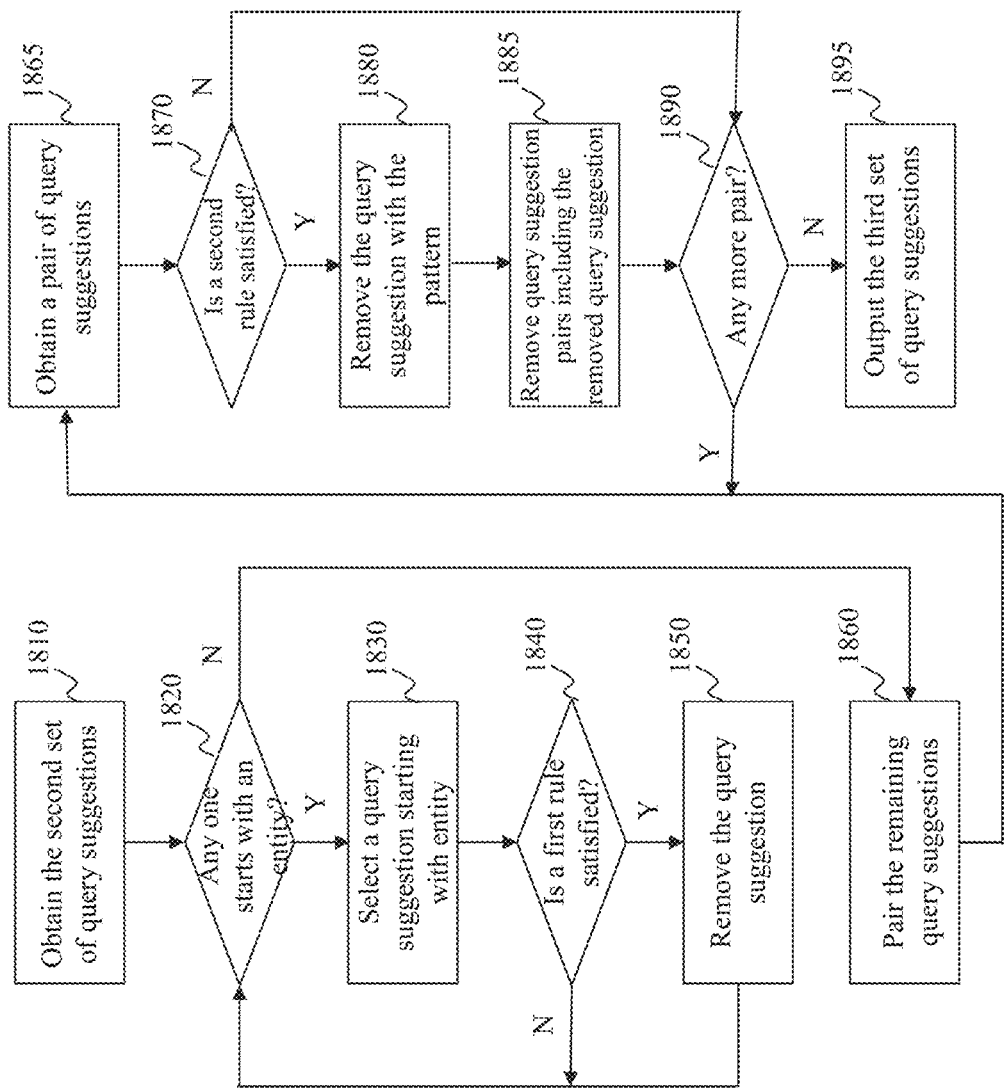
FIG. 18 is a flowchart of an exemplary process for rule-based deduplication, according to an embodiment of the present teaching.

FIG. 18 is a flowchart of an exemplary process for rule-based deduplication, according to an embodiment of the present teaching. The exemplary process in FIG. 18 may be performed by the rule-based de-duplicator 1130 in FIG. 17.

At step 1810, the second set of query suggestions are obtained. At step 1820, it is determined whether there is a query suggestion from the second set of query suggestions starting with an entity. If so, the process proceeds to step 1830. Otherwise, the process proceeds to step 1860.

At step 1830, a query suggestion starting with the entity is selected from the second set of query suggestions. At step 1840, it is determined whether a first rule is satisfied with respect to the query suggestion. For example, the first rule is satisfied when a portion of the query suggestion excluding the entity matches a first suggestion pattern from the suggestion pattern database. If so, the process proceeds to step 1850, where the query suggestion is removed from the second set of query suggestions. Otherwise, the process returns to step 1820.

At step 1860, the remaining query suggestions from the second set of query suggestions are paired. At step 1865, a pair of query suggestions is obtained. At step 1870, it is determined whether a second rule is satisfied with respect to the pair of query suggestions. For example, the second rule is satisfied when a first query suggestion includes a second query suggestion in the same pair, and a portion of the first query suggestion that excludes the second query suggestion matches a second suggestion pattern in the suggestion pattern database. The second suggestion pattern may be the same as the first suggestion pattern, or different from the first suggestion pattern. If so, the process proceeds to step 1880. Otherwise, the process proceeds to step 1890.

At step 1880, the first query suggestion in the pair is removed. Alternatively, the second query suggestion in the pair is removed. At step 1885, one or more pairs of query suggestions including the removed query suggestion are removed. At step 1890, it is determined whether there is any more pair of query suggestions. If so, the process returns to step 1865. Otherwise, the process proceeds to step 1895. At step 1895, the remaining query suggestions from the second set of query suggestions are outputted as the third set of query suggestions.

Figure 19:
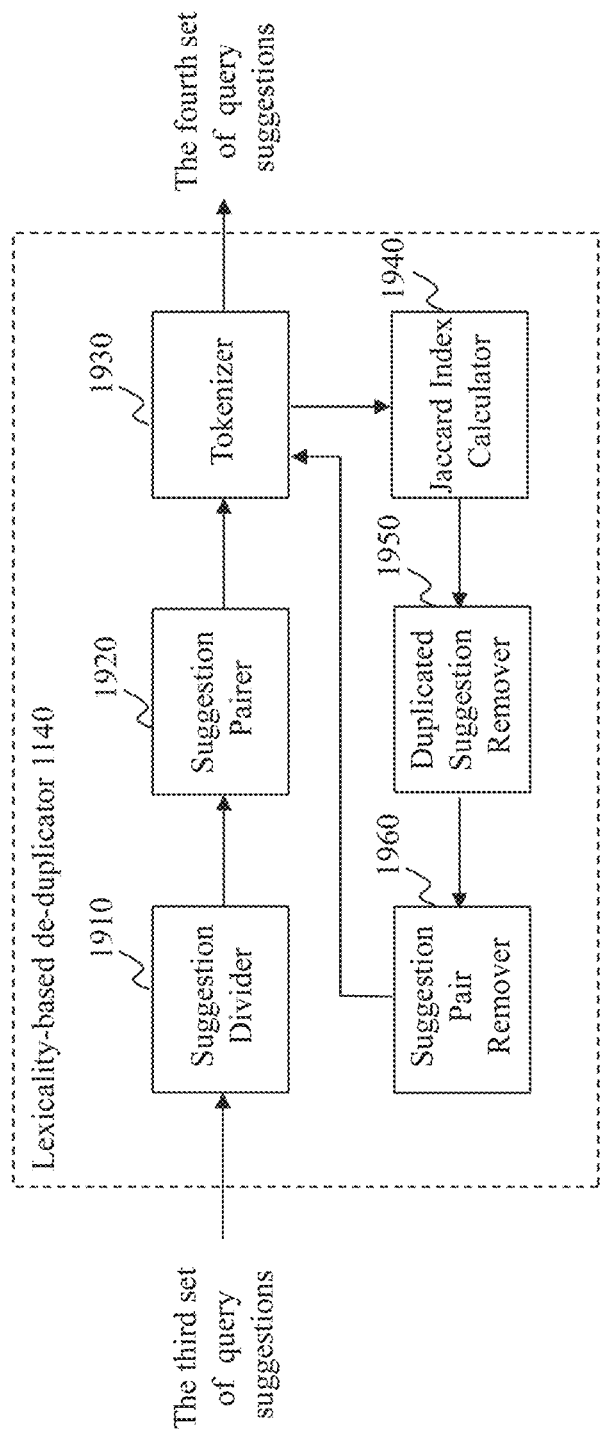
FIG. 19 illustrates an exemplary diagram of a lexicality-based de-duplicator, according to an embodiment of the present teaching.

FIG. 19 illustrates an exemplary diagram of the lexicality-based de-duplicator 1140, according to an embodiment of the present teaching. The lexicality-based de-duplicator 1140 may be included in the suggestion de-duplicator 330 as shown in FIG. 11. The lexicality-based de-duplicator 1140 in this example includes a suggestion divider 1910, a suggestion pairer 1920, a tokenizer 1930, a Jaccard index calculator 1940, a duplicated suggestion remover 1950, and a suggestion pair remover 1960.

The suggestion divider 1910 obtains the third set of query suggestion. The suggestion divider 1910 further divides the third set of query suggestions into a plurality of groups of query suggestions, for example, based on hash codes of the third set of query suggestions. In each group of query suggestions, the suggestion pairer 1920 pairs the group of query suggestions to generate a plurality of pairs of query suggestions. The tokenizer 1930 tokenizes each pair of query suggestions in the group. For example, a first query suggestion in a pair may be "I am a kid." Accordingly, the first query suggestion may be tokenized into 8 first tokens each includes three characters (or another suitable number of characters), such as "I*a," "*am," "am*," "m*a," "*a*," "a*k," "*ki," and "kid." Here "*" represents a space. In addition, a second query suggestion in the same pair may be "I am a boy." Accordingly, the second query suggestion may be tokenized into 8 second tokens each includes three characters (or another suitable number of characters), such as "I*a," "*am," "am*," "m*a," "*a*," "a*b," "*bo," and "boy." The Jaccard index calculator 1940 calculates a Jaccard index with respect to each pair of query suggestions in the group. In an embodiment, the Jaccard index with respect to the pair may be calculated as a number of shared tokens between the first query suggestion and the second query suggestion divided by a total number of tokens in the first query suggestion and the second query suggestion in the pair. In the same example as above, there are five tokens shared between the first query suggestion and the second query suggestion, such as "I*a," "*am," "am*," "m*a," "*a*." In addition, there are a total of 16 tokens in the first query suggestion and the second query suggestion. Therefore, the Jaccard index with respect to the pair of query suggestions may be calculated as 5/16=0.3125.

In another embodiment, the tokenizer 1930 further tokenizes the search query from the user. For example, the search query from the user may be "I am Tom." Accordingly, the search query may be tokenized into six tokens such as "I*a," "*am," "am*," "m*T," "*To," and "Tom." Further, the tokenizer 1930 may remove one or more first tokens shared between the search query and the first query suggestions, such as, "I*a," "*am," and "am*." As a result, the remaining first tokens with respect to the first query suggestion are "m*a," "*a*," "a*k," "*ki," and "kid." Similarly, the tokenizer 1930 may remove one or more second tokens shared between the search query and the second query suggestions, such as, "I*a," "*am," and "am*." As a result, the remaining second tokens with respect to the second query suggestion are "m*a," "*a*," "a*b," "*bo," and "boy." Further, the Jaccard index calculator 1940 may calculate the Jaccard index with respect to the pair of query suggestions based on the remaining first tokens and the remaining second tokens. For example, there are two tokens shared between the remaining first tokens and the remaining second tokens, i.e., "m*a," "*a*," Further, there is a total of 10 tokens in the remaining first tokens and the remaining second tokens. Therefore, the Jaccard index with respect to the pair of query suggestions may be determined to be $2/10=0.2$.

The duplicated suggestion remover 1950 determines whether the Jaccard index with respect to each pair exceeds a Jaccard threshold. If so, the duplicated suggestion remover 1950 determines the pair of query suggestions includes a pair of duplicated query suggestions. Therefore, the duplicated suggestion remover 1950 further removes one of the pair of query suggestions (e.g., the first query suggestion or the second query suggestion in the pair). Otherwise, the duplicated suggestion remover 1950 determines the pair of query suggestions does not include a pair of duplicated query suggestions.

The suggestion pair remover 1960 removes one or more pairs of query suggestions including the removed query suggestions. After the groups of query suggestions are all processed, the tokenizer 1930 further outputs the remaining query suggestions as the fourth set of query suggestions.

Figure 20:
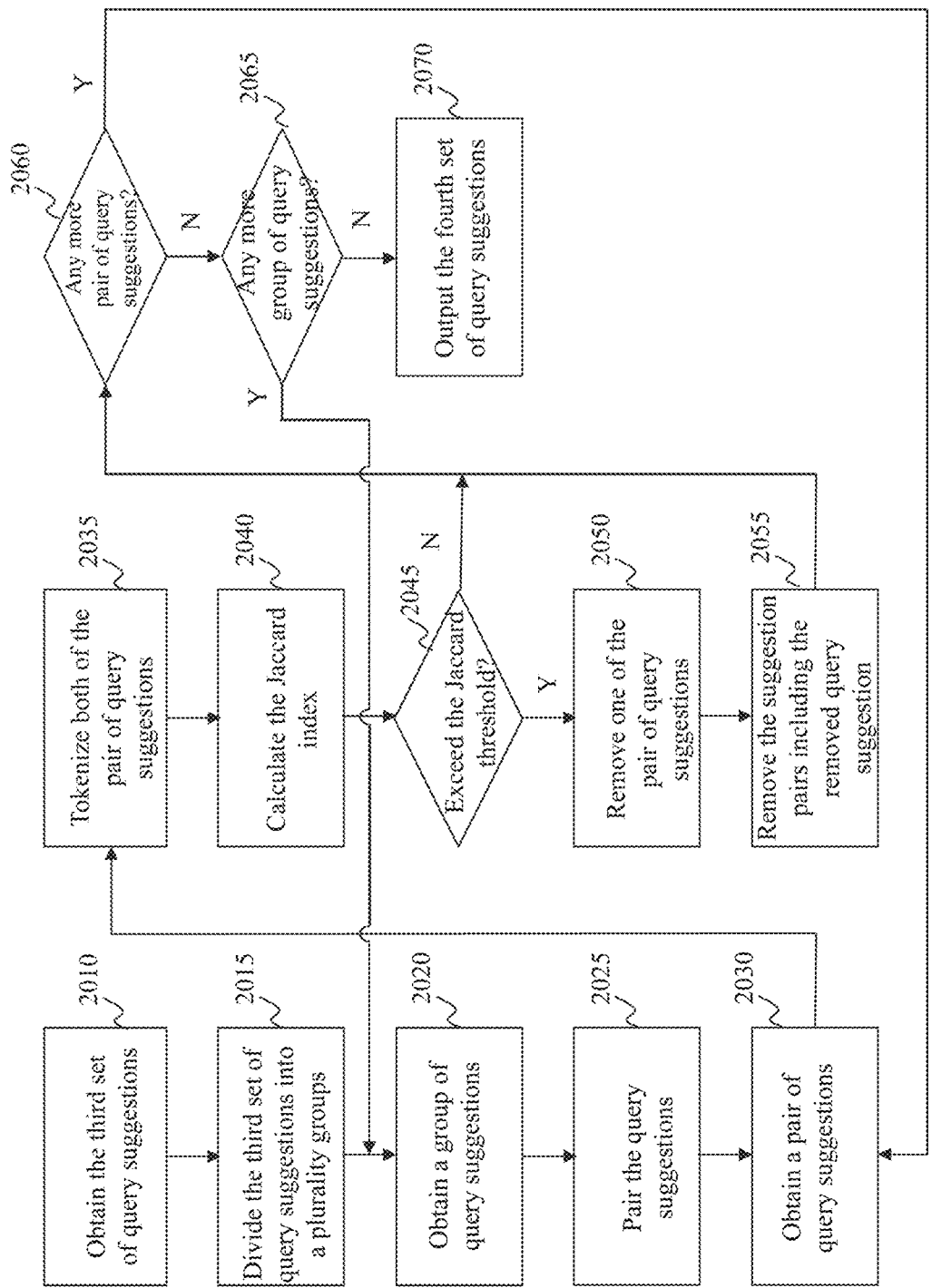
FIG. 20 is a flowchart of an exemplary process for lexicality-based deduplication, according to an embodiment of the present teaching.

FIG. 20 is a flowchart of an exemplary process for lexicality-based deduplication, according to an embodiment of the present teaching. The exemplary process in FIG. 20 may be performed by the lexicality-based de-duplicator 1140.

At step 2010, the third set of query suggestion is obtained. At step 2015, the third set of query suggestions is divided into a plurality of groups of query suggestions, for example, based on hash codes of the third set of query suggestions. At step 2020, a group of query suggestions are obtained from the plurality of groups. At step 2025, the query suggestions in the group are paired to generate a plurality of pairs of query suggestions. At step 2030, a pair of query suggestions is obtained. At step 2035, the pair of query suggestions is tokenized. For example, a first query suggestion in the pair may be "I am a kid." Accordingly, the first query suggestion may be tokenized into 8 first tokens each includes three characters (or another suitable number of characters), such as "I*a," "*am," "am*," "m*a," "*a*," "a*k," "ki," and "kid." Here "*" represents a space. In addition, a second query suggestion in the same pair may be "I am a boy." Accordingly, the second query suggestion may be tokenized into 8 second tokens each includes three characters (or another suitable number of characters), such as "Ia," "*am," "am*," "m*a," "*a*," "a*b," "*bo," and "boy." At step 2040, a Jaccard index with respect to the pair is calculated. In an embodiment, the Jaccard index with respect to the pair may be calculated as a number of shared tokens between the first query suggestion and the second query suggestion divided by a total number of tokens in the first query suggestion and the second query suggestion of the pair. In the same example as above, there are five tokens shared between the first query suggestion and the second query suggestion, such as "I*a," "*am," "am*," "m*a," "*a*." In addition, there are a total of 16 tokens in the first query suggestion and the second query suggestion. Therefore, the Jaccard index with respect to the pair of query suggestions may be calculated as $5/16=0.3125$.

Alternatively, at step 2035, the search query from the user is also tokenized. For example, the search query from the user may be "I am Tom." Accordingly, the search query may be tokenized into six tokens such as "I*a," "*am," "am*," "m*T," "To," and "Tom." Further, one or more first tokens shared between the search query and the first query suggestions (such as, "I*a," "*am," and "am*") are removed. As a result, the remaining first tokens with respect to the first query suggestion are "m*a," "*a*," "a*k," "*ki," and "kid." Similarly, one or more second tokens shared between the search query and the second query suggestions (such as, "I*a," "*am," and "am*") are removed. As a result, the remaining second tokens with respect to the second query suggestion are "m*a," "*a*," "a*b," "*bo," and "boy." Further, at step 2040, the Jaccard index with respect to the pair of query suggestions may be calculated based on the remaining first tokens and the remaining second tokens. For example, there are two tokens shared between the remaining first tokens and the remaining second tokens, i.e., "m*a," "*a*," Further, there is a total of 10 tokens in the remaining first tokens and the remaining second tokens. Therefore, the Jaccard index with respect to the pair of query suggestions may be determined to be $2/10=0.2$.

At step 2045, it is determined whether the Jaccard index with respect to the pair exceeds a Jaccard threshold. If so, it is determined the pair of query suggestions includes duplicated query suggestions. Therefore, the process proceeds to step 2050. Otherwise, it is determined the pair of query suggestions does not include duplicated query suggestions. The process therefore proceeds to step 2060. At step 2050, one of the pair of suggestions is removed. For example, either the first query suggestion or the second query suggestion is removed. At step 2055, one or more pairs of query suggestions including the removed query suggestion are removed.

At step 2060, it is determined whether there is any more pair of query suggestions in the group of query suggestions. If so, the process returns to step 2030. Otherwise, the process proceeds to step 2065. At step 2065, it is determined whether there is any more group of query suggestions. If so, the process returns to step 2020. Otherwise, the process proceeds to step 2070, here the remaining query suggestions are outputted as the fourth set of query suggestions.

Figure 21:
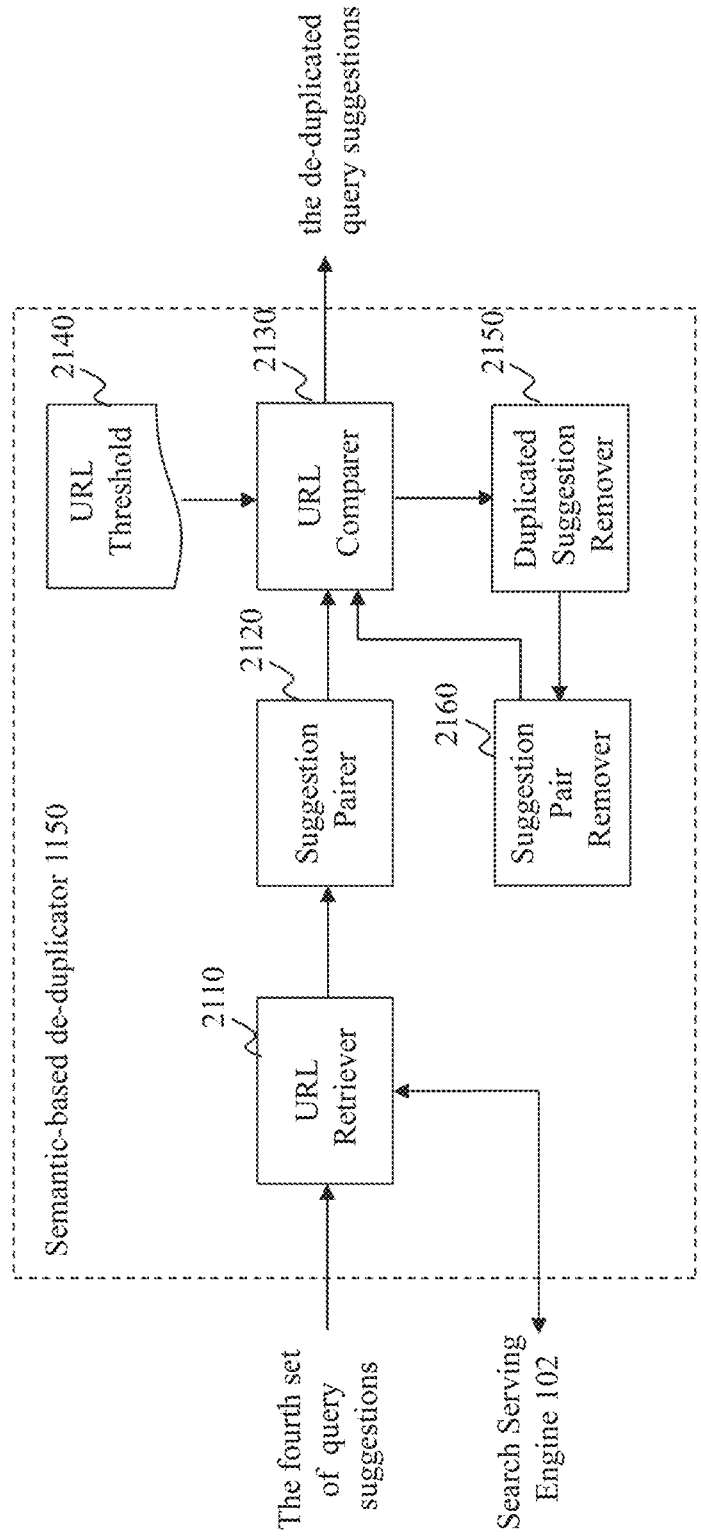
FIG. 21 illustrates an exemplary diagram of a semantic-based de-duplicator, according to an embodiment of the present teaching.

FIG. 21 illustrates an exemplary diagram of a semantic-based de-duplicator 1150, according to an embodiment of the present teaching. The semantic-based de-duplicator 1150 may be included in the suggestion de-duplicator 330 as shown in FIG. 11. The semantic-based de-duplicator 1150 in this example includes a uniform resource locator (URL) retriever 2110, a suggestion pairer 2120, a URL comparer 2130, a duplicated suggestion remover 2150, and a suggestion pair remover 2160.

The URL retriever 2110 obtains the fourth set of query suggestions. The URL retriever 2110 further retrieves one or more URLs of one or more search results with respect to each of the set of query suggestions, for example, from the search serving engine 102. The suggestion pairer 2120 pairs the fourth set of query suggestions to obtain a plurality of pairs of query suggestions. The URL comparer 2130 compares the URLs with respect to each pair of query suggestions. For example, a first group of URLs with respect to a first query suggestion in a pair is compared with a second group of URLs with respect to a second query suggestion in the same pair. The URL comparer 2130 further determines whether a number of shared URLs in the pair of query suggestions exceeds a URL threshold 2140. If so, the URL comparer 2130 determines the pair of query suggestions includes a pair of duplicated query suggestions. Otherwise, the URL comparer 2130 determines the pair of query suggestions does not include the pair of duplicated query suggestions When the URL comparer 2130 determines the pair of query suggestions includes the pair of duplicated query suggestions, the duplicated suggestion remover 2150 removes one query suggestion of the pair of query suggestions. The suggestion pair remover 2160 removes one or more pairs of query suggestions including the removed query suggestion. After the plurality of pairs of query suggestions are processed, the URL comparer 2130 further outputs the remaining query suggestions as de-duplicated query suggestions.

FIG. 22 is a flowchart of an exemplary process for semantic-based deduplication, according to an embodiment of the present teaching. The exemplary process in FIG. 22 may be performed by the semantic-based de-duplicator 1150.

At step 2210, the fourth set of query suggestions are obtained. At step 2220, one or more URLs of one or more search results with respect to each of the set of query suggestions are retrieved, for example, from the search serving engine. At step 2230, the fourth set of query suggestions are paired to obtain a plurality of pairs of query suggestions. At step 2240, a pair of query suggestions is obtained from the plurality of pairs of query suggestions. At step 2250, the URLs with respect to the pair of query suggestions are compared. For example, a first group of URLs with respect to a first query suggestion in the pair is compared with a second group of URLs with respect to a second query suggestion in the same pair. At step 2260, it is determined whether a number of shared URLs in the pair of query suggestions exceeds a URL threshold. If so, the process proceeds to step 2270. Otherwise, the process proceeds to step 2280.

At step 2270, one query suggestion of the pair of query suggestions is removed. At step 2275, one or more pairs of query suggestions including the removed query suggestion are removed. At step 2280, it is determined whether there is any more pair of query suggestions. If so, the process returns to step 2240. Otherwise, the process proceeds to step 2290, where the remaining query suggestions are outputted as de-duplicated query suggestions.

Figures 23A, 23B, 23C:
FIGS. 23A-23C illustrate various examples of de-duplicating query suggestions, according to an embodiment of the present teaching.

FIGS. 23A-23C illustrate various examples of de-duplicating query suggestions, according to an embodiment of the present teaching. As shown in the left windows of FIGS. 23A-23C, a user inputs search query of "4shared," "allstate," and "hayao miyazaki," respectively. The corresponding query suggestions generated using the existing techniques as described above ((e.g., prefix matching, reordering the search query, and/or removing stop word(s) in the search query) comprise a plurality of duplicated query suggestions as denoted by the strikethrough texts as shown. The suggestion de-duplicator 330 as shown in FIG. 11 may be used to detect and remove the duplicated search queries so that one or more additional non-duplicated query suggestions may instead be presented to the user, for example, as show in the right windows of FIGS. 23A-23C. This is done so that the precious real state in the query suggestion presentation area is prevented from being wasted to present the duplicated query suggestions. Accordingly, the user's search experience is improved.

Figures 24A, 24B:
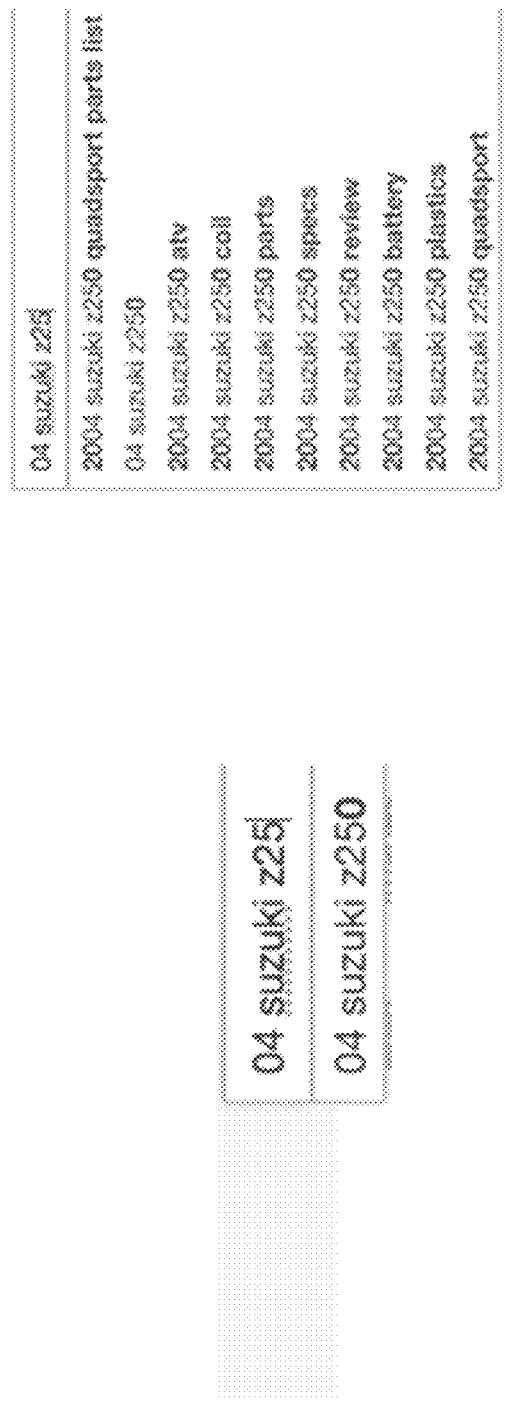
FIGS. 24A-24B illustrate an example of providing query suggestions by rewriting the query, according to an embodiment of the present teaching.

FIGS. 24A-24B illustrate an example of providing query suggestions by rewriting the search query, according to an embodiment of the present teaching. As shown in FIG. 24A, a user inputs a search query of "04 suzuki z25." Only one query suggestion (i.e., "04 suzuki z250") can be provided to the user using the existing techniques as described above (e.g., prefix matching, reordering the search query, and/or removing stop word(s) in the search query). As shown in FIG. 24B, when the search query "04 suzuki z25" is rewritten to "2004 suzuki z250," by replacing "04" with "2004" and by replacing "z25" with "z250," a plurality of additional query suggestions may be provided based on the rewritten search query "2004 suzuki z250." The plurality of additional query suggestions is blended with the original query suggestion (i.e., "04 suzuki z250"), and collectively presented to the user.

Figure 25:
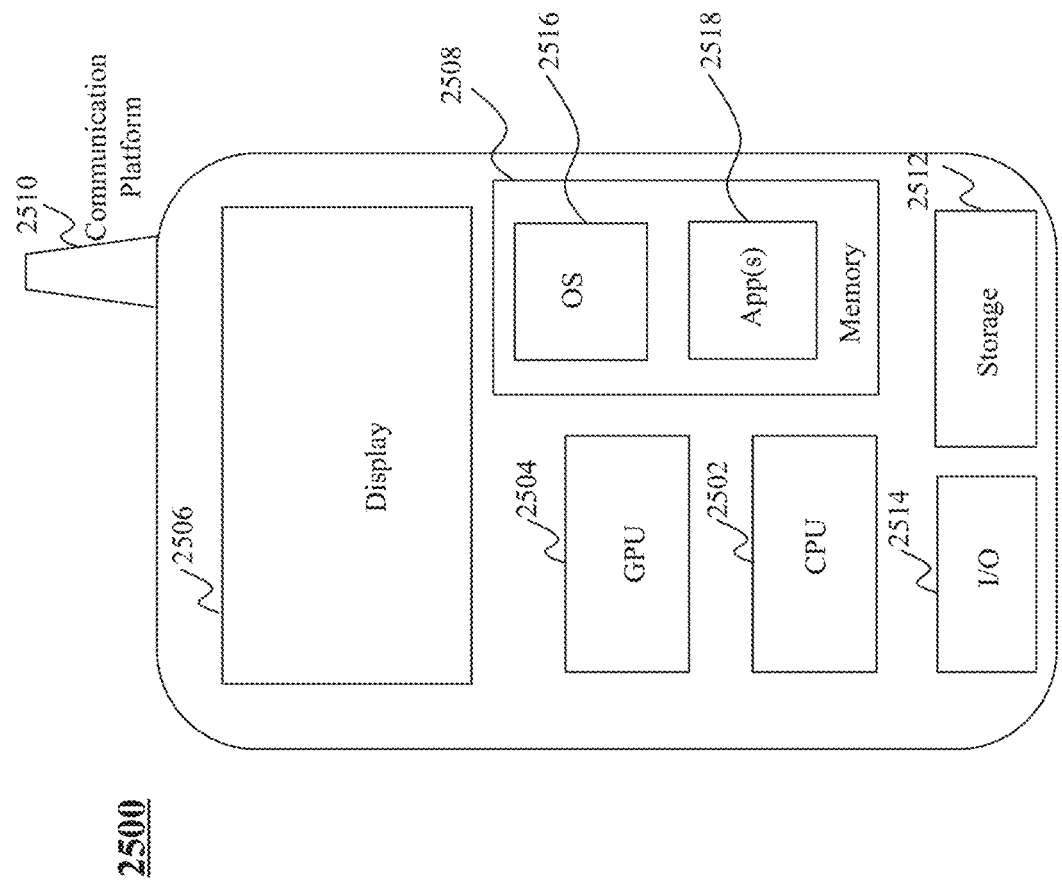
FIG. 25 depicts a general mobile device architecture on which the present teaching can be implemented.

FIG. 25 depicts a general mobile device architecture on which the present teaching can be implemented. In this example, the user device 108 is a mobile device 2500, including but is not limited to, a smart phone, a tablet, a music player, a handled gaming console, a GPS receiver. The mobile device 2500 in this example includes one or more central processing units (CPUs) 2502, one or more graphic processing units (GPUs) 2504, a display 2506, a memory 2508, a communication platform 2510, such as a wireless communication module, storage 2512, and one or more input/output (I/O) devices 2514. Any other suitable component, such as but not limited to a system bus or a controller (not shown), may also be included in the mobile device 2500. As shown in FIG. 25, a mobile operating system 2516, e.g., iOS, Android, Windows Phone, etc., and one or more applications 2518 may be loaded into the memory 2508 from the storage 2512 in order to be executed by the CPU 2502. The applications 2518 may include a web browser or any other suitable mobile search apps. Execution of the applications 2518 may cause the mobile device 2500 to perform some processing as described before. For example, the display of search suggestions and results is made by the GPU 2504 in conjunction with the display 2506. User inputs of search queries are received via the I/O devices 2514 and sent to the search serving engine 102 via the communication platform 2510.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

FIG. 26 depicts a general computer architecture on which the present teaching can be implemented and has a functional block diagram illustration of a computer hardware platform that includes user interface elements. The computer 2600 may be a general-purpose computer or a special purpose computer. This computer 2600 can be used to implement any components of the search suggestion architecture as described herein. Different components of the system, e.g., as depicted in FIGS. 1A-1D and 2A-2D, can all be implemented on one or more computers such as computer 2600, via its hardware, software program, firmware, or a combination thereof. Although only one such computer is shown, for convenience, the computer functions relating to search suggestion may be implemented in a distributed fashion on a number of similar platforms, to distribute the processing load.

The computer 2600, for example, includes COM ports 2602 connected to and from a network connected thereto to facilitate data communications. The computer 2600 also includes a CPU 2604, in the form of one or more processors, for executing program instructions. The exemplary computer platform includes an internal communication bus 2606, program storage and data storage of different forms, e.g., disk 2608, read only memory (ROM) 2610, or random access memory (RAM) 2612, for various data files to be processed and/or communicated by the computer, as well as possibly program instructions to be executed by the CPU 2604. The computer 2600 also includes an I/O component 2614, supporting input/output flows between the computer and other components therein such as user interface elements 2616. The computer 2600 may also receive programming and data via network communications.

Hence, aspects of the method of providing search suggestion, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one machine each of which having at least one processor, storage, and a communication platform connected to a network for providing query suggestions, the method comprising:
receiving a search query from a user;
generating at least one rewritten search query by replacing at least some text in the search query with a synonym of the at least some text, wherein the synonym of the at least some text is obtained based on a plurality of previously submitted search queries;
obtaining a first plurality of query suggestions based on the search query and the at least one rewritten search query;
removing one or more duplicative query suggestions from the first plurality of query suggestions to obtain a second plurality of query suggestions, wherein the one or more duplicative query suggestions have a same stem and same semantics as at least one of the first plurality of query suggestions and are determined based on at least two of the first plurality of query suggestions being identical after one or more stop words are removed from the first plurality of query suggestions; and
providing at least a portion of the second plurality of query suggestions to the user.

2. The method of claim 1, wherein the synonym is obtained from a synonym database generated based on the plurality of previously submitted search queries, and wherein the method further comprises building the synonym database by:
obtaining the plurality of previously submitted search queries;
extracting one or more pairs of a phrase and a respective context from each of the plurality of previously submitted search queries, wherein the phrase includes a text string in the previously submitted search query, and the respective context includes remaining text of the previously submitted search query that excludes the text string;

identifying one or more synonym candidates for each of a plurality of phrases based on the extracted one or more pairs from each of the plurality of previously submitted search queries, wherein the one or more synonym candidates and the phrase have a same respective context; and storing at least a portion of the one or more synonym candidates as one or more synonyms for each of the plurality of phrases in the synonym database.

3. The method of claim 1, wherein the first plurality of query suggestions comprises a set of query suggestions, and wherein removing the one or more duplicative query suggestions comprises:

removing one or more query suggestions from the set of query suggestions, wherein the one or more query suggestions comprise the one or more duplicative query suggestions, and the second plurality of query suggestions is obtained based on the set of query suggestions having the one or more query suggestions removed therefrom.

4. The method of claim 3, wherein removing the one or more query suggestions comprises:

identifying, from each query suggestion of the set of query suggestions, one or more phrases stored in a synonym database;

generating, for each query suggestion of the set of query suggestions, one or more signatures based on the one or more phrases and the synonym database;

identifying, from the set of query suggestions, one or more groups of query suggestions each having a same signature based on the one or more signatures;

selecting, from each of the one or more groups, one query suggestion; and removing, in each of the one or more groups, unselected one or more query suggestions.

5. The method of claim 1, wherein the first plurality of query suggestions comprises a set of query suggestions, removing comprises:

forming a plurality of pairs of query suggestions based on the set of query suggestions;

obtaining a plurality of tokens based on each of the plurality of pairs;

calculating, for each of the plurality of pairs, a Jaccard index based on the plurality of tokens with respect to the pair;

removing, in each of at least a portion of the plurality of pairs, one query suggestion in the pair when the Jaccard index with respect to the pair exceeds a threshold, wherein the one or more duplicative query suggestions comprise the one query suggestion in the pair for each of the at least the portion of the plurality of pairs; and removing, from the plurality of pairs, one or more pairs including the one query suggestion in the pair.

6. The method of claim 3, wherein removing the one or more query suggestions comprises:

obtaining one or more uniform resource locators (URL) of one or more search results with respect to each query suggestion of the set of query suggestions;

forming a plurality of pairs of query suggestions based on the set of query suggestions;

removing, in each of at least a portion of the plurality of pairs of query suggestions, one query suggestion when a number of shared URLs with respect to the pair of query suggestions exceeds a URL threshold; and removing, from the plurality of pairs, one or more pairs including the removed query suggestion.

7. The method of claim 3, wherein removing the one or more query suggestions comprises:

identifying, from the set of query suggestions, a group of query suggestions including entities;

determining, from the group of query suggestions, the one or more query suggestions, wherein a portion of each of the one or more query suggestions excluding an entity is included in a suggestion pattern database; and removing, from the group of query suggestions, the one or more query suggestions.

8. The method of claim 7, further comprising:

building the suggestion pattern database by:

determining a group of previously submitted search queries from the plurality of previously submitted search queries, wherein each previously submitted search query of the group of previously submitted search queries includes an entity;

extracting a group of patterns from the group of previously submitted search queries, wherein each pattern of the group of patterns is a portion of a respective previously submitted search query excluding the entity;

determining, with respect to each pattern of the group of patterns, a number of occurrences in the group of patterns of previously submitted search queries;

selecting one or more patterns from the group of patterns based at least in part on the numbers of occurrence; and storing the one or more patterns in the suggestion pattern database.

9. A system having at least one processor, storage, and a communication platform connected to a network for providing query suggestions, the system comprising:

a lookup engine, implemented by the at least one processor, configured to:

receive a search query from a user, and obtain a first plurality of query suggestions based on the search query and at least one rewritten search query;

a query rewriter, implemented by the at least one processor, configured to generate the at least one rewritten search query by replacing at least some text in the search query with a synonym of the at least some text, wherein the synonym of the at least some text is obtained based on a plurality of previously submitted search queries;

a suggestion de-duplicator, implemented by the at least one processor, configured to remove one or more duplicative query suggestions from the first plurality of query suggestions to obtain a second plurality of query suggestions, wherein the one or more duplicative query suggestions have a same stem and same semantics as at least one of the first plurality of query suggestions and are determined based on at least two of the first plurality of query suggestions being identical after one or more stop words are removed from the first plurality of query suggestions; and a suggestion selector, implemented by the at least one processor, configured to provide at least a portion of the second plurality of query suggestions to the user.

10. The system of claim 9, wherein:

the first plurality of query suggestions comprises a set of query suggestions;

the suggestion de-duplicator is configured to remove one or more query suggestions from the set of query suggestions;

the one or more query suggestions comprise the one or more duplicative query suggestions; and the second plurality of query suggestions is obtained based on the set of query suggestions having the one or more query suggestions removed therefrom.

11. The system of claim 10, wherein the suggestion de-duplicator comprises a synonym-based de-duplicator, implemented by the at least one processor, the synonym-based de-duplicator comprising:
a phrase identifier configured to identify, from each query suggestion of the set of query suggestions, one or more phrases stored in a synonym database;
a signature generator configured to generate, for each query suggestion of the set of query suggestions, one or more signatures based on the one or more phrases and the synonym database;
a duplication identifier configured to identify, from the set of query suggestions, one or more groups of query suggestions each having a same signature based on the one or more signatures;
a suggestion selector configured to select, from each of the one or more groups, one query suggestion; and
a suggestion remover configured to remove, in each of the one or more groups, unselected one or more query suggestions.

12. The system of claim 10, wherein the suggestion de-duplicator comprises a lexicality-based de-duplicator, implemented by the at least one processor the lexicality-based de-duplicator comprising:
a suggestion pairer configured to form a plurality of pairs of query suggestions based on the set of query suggestions;
a tokenizer configured to obtain a plurality of tokens based on each of the plurality of pairs;
a Jaccard index calculator configured to calculate, for each of the plurality of pairs, a Jaccard index based on the plurality of tokens with respect to the pair;
a duplicated suggestion remover configured to remove, in each of at least a portion of the plurality of pairs, one query suggestion in the pair when the Jaccard index with respect to the pai exceeds a threshold, wherein the one or more duplicative query suggestions comprise the one query suggestion in the pair for each of the at least the portion of the plurality of pairs; and
a suggestion pair remover configured to remove, from the plurality of pairs, one or more pairs including the one query suggestion in the pair.

13. The system of claim 10, wherein the suggestion de-duplicator comprises a semantic-based de-duplicator, implemented by the at least one processor, the semantic-based de-duplicator comprising:
a uniform resource locator (URL) retriever configured to obtain one or more URLs of one or more search results with respect to each query suggestion of the set of query suggestions;
a suggestion pairer configured to form a plurality of pairs of query suggestions based on the set of query suggestions;
a duplicated suggestion remover configured to remove, in each of at least a portion of the plurality of pairs of query suggestions, one query suggestion when a number of shared URLs with respect to the pair of query suggestions exceeds a URL threshold; and
a suggestion pair remover configured to remove, from the plurality of pairs, one or more pairs including the removed query suggestion.

14. The system of claim 10, wherein the suggestion de-duplicator comprises a rule-based de-duplicator, implemented by the at least one processor, the rule-based de-duplicator comprising:
an entity identifier configured to identify, from the set of query suggestions, a group of query suggestions including entities;
a pattern identifier configured to determine, from the group of query suggestions, the one or more query suggestions, wherein a portion of each of the one or more query suggestions excluding an entity is included in a suggestion pattern database; and
a duplicated suggestion remover configured to remove, from the group of query suggestions, the one or more query suggestions.

15. A non-transitory machine-readable medium having information recorded thereon for providing query suggestions, wherein the information, when read by the machine, causes the machine to perform the following:
receiving a search query from a user;
generating at least one rewritten search query by replacing at least some text in the search query with a synonym of the at least some text, wherein the synonym of the at least some text is obtained based on a plurality of previously submitted search queries;
obtaining a first plurality of query suggestions based on the search query and the at least one rewritten search query;
removing one or more duplicative query suggestions from the first plurality of query suggestions to obtain a second plurality of query suggestions, wherein the one or more duplicative query suggestions have a same stem and same semantics as at least one of the first plurality of query suggestions and are determined based on at least two of the first plurality of query suggestions being identical after one or more stop words are removed from the first plurality of query suggestions; and
providing at least a portion of the second plurality of query suggestions to the user.

16. The medium of claim 15, wherein the first plurality of query suggestions comprises a set of query suggestions, and wherein the information, when read by the machine, further causes the machine to:
remove one or more query suggestions from the set of query suggestions, wherein the one or more query suggestions comprise the one or more duplicative query suggestions, and the second plurality of query suggestions is obtained based on the set of query suggestions having the one or more query suggestions removed therefrom.

17. The medium of claim 16, wherein the information, when read by the machine, further causes the machine to remove the one or more query suggestions by performing following:
identifying, from each query suggestion of the set of query suggestions, one or more phrases stored in a synonym database;
generating, for each query suggestion of the set of query suggestions, one or more signatures based on the one or more phrases and the synonym database;
identifying, from the set of query suggestions, one or more groups of query suggestions each having a same signature based on the one or more signatures;
selecting, from each of the one or more groups, one query suggestion; and removing, in each of the one or more groups, unselected one or more query suggestions.

18. The medium of claim 15, wherein the first plurality of query suggestions comprises a set of query suggestions, the information, when read by the machine, further causes the machine to remove the one or more query suggestions by performing following:
    forming a plurality of pairs of query suggestions based on the set of query suggestions;
    obtaining a plurality of tokens based on each of the plurality of pairs;
    calculating, for each of the plurality of pairs, a Jaccard index based on the plurality of tokens with respect to the pair;
    removing, in each of at least a portion of the plurality of pairs, one query suggestion in the pair when the Jaccard index with respect to the pair exceeds a threshold, wherein the one or more duplicative query suggestions comprise the one query suggestion in the pair for each of the at least the portion of the plurality of pairs; and
    removing, from the plurality of pairs, one or more pairs including the one query suggestion in the pair.

19. The medium of claim 16, wherein the information, when read by the machine, further causes the machine to remove the one or more query suggestions by performing following:
    obtaining one or more uniform resource locators (URL) of one or more search results with respect to each query suggestion of the set of query suggestions;
    forming a plurality of pairs of query suggestions based on the set of query suggestions;
    removing, in each of at least a portion of the plurality of pairs of query suggestions, one query suggestion when a number of shared URLs with respect to the pair of query suggestions exceeds a URL threshold; and
    removing, from the plurality of pairs, one or more pairs including the removed query suggestion.

20. The medium of claim 16, wherein the information, when read by the machine, further causes the machine to remove the one or more query suggestions by performing following:
    identifying, from the set of query suggestions, a group of query suggestions including entities;
    determining, from the group of query suggestions, one or more query suggestions, wherein a portion of each of the one or more query suggestions excluding an entity is included in a suggestion pattern database; and
    removing, from the group of query suggestions, the one or more query suggestions.

21. The method of claim 1, wherein removing the one or more duplicative query suggestions comprises:
    removing the one or more stop words from the first plurality of query suggestions; and
    determining, after the one or more stop words have been removed, that the at least two of the first plurality of query suggestions are identical, wherein the one or more duplicative query suggestions determined to have the same stem and be the same semantics comprise one or more of the at least two of the first plurality of query suggestions that are identical.

* * * * *